(12) United States Patent
Wang et al.

(10) Patent No.: US 11,380,890 B2
(45) Date of Patent: *Jul. 5, 2022

(54) SURFACE MODIFICATION OF SILICON PARTICLES FOR ELECTROCHEMICAL STORAGE

(71) Applicant: Enevate Corporation, Irvine, CA (US)

(72) Inventors: Wei Wang, Newport Beach, CA (US); Benjamin Yong Park, Mission Viejo, CA (US); Ian Russell Browne, Irvine, CA (US)

(73) Assignee: Enevate Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/744,818

(22) Filed: Jan. 16, 2020

(65) Prior Publication Data

US 2020/0227738 A1   Jul. 16, 2020
US 2022/0085356 A9   Mar. 17, 2022

Related U.S. Application Data

(63) Continuation-in-part of application No. 15/413,021, filed on Jan. 23, 2017, now Pat. No. 10,622,620, (Continued)

(51) Int. Cl.
*H01B 1/04* (2006.01)
*H01M 4/48* (2010.01)
(Continued)

(52) U.S. Cl.
CPC ............. *H01M 4/366* (2013.01); *C01B 32/90* (2017.08); *H01B 1/04* (2013.01); *H01B 1/24* (2013.01);
(Continued)

(58) Field of Classification Search
CPC ... H01B 1/00; H01B 1/20; H01B 1/22; H01B 1/24; H01M 4/48; H01M 4/58
See application file for complete search history.

(56) References Cited

U.S. PATENT DOCUMENTS 3,990,098 A   11/1976   Mastrangelo
4,435,444 A   3/1984    Goldberger
(Continued)

FOREIGN PATENT DOCUMENTS

CN   1667855      9/2005
CN   101095251    12/2007
(Continued)

OTHER PUBLICATIONS

Ma et al., "Si-Based Anode Materials for Li-Ion Batteries: A Mini Review", Nano-Micro Letters, 2014, vol. 6, No. 4, pp. 347-358.
(Continued)

*Primary Examiner* — Mark Kopec
(74) *Attorney, Agent, or Firm* — McAndrews, Held & Malloy, Ltd.

(57) ABSTRACT

Silicon particles for active materials and electro-chemical cells are provided. The active materials comprising silicon particles described herein can be utilized as an electrode material for a battery. In certain embodiments, the composite material includes greater than 0% and less than about 90% by weight silicon particles, the silicon particles having an average particle size between about 10 nm and about 40 μm, wherein the silicon particles have surface coatings comprising silicon carbide or a mixture of carbon and silicon carbide, and greater than 0% and less than about 90% by weight of one or more types of carbon phases, wherein at least one of the one or more types of carbon phases is a substantially continuous phase.

8 Claims, 24 Drawing Sheets

Related U.S. Application Data which is a continuation of application No. 13/799,405, filed on Mar. 13, 2013, now Pat. No. 9,553,303, which is a continuation-in-part of application No. 13/601,976, filed on Aug. 31, 2012, now abandoned, and a continuation-in-part of application No. 13/008,800, filed on Jan. 18, 2011, now Pat. No. 9,178,208, application No. 16/744,818, filed on Jan. 16, 2020, which is a continuation of application No. 15/886,136, filed on Feb. 1, 2018, now Pat. No. 10,541,412, which is a continuation of application No. 14/821,586, filed on Aug. 7, 2015, now abandoned.

(60) Provisional application No. 61/530,881, filed on Sep. 2, 2011, provisional application No. 61/295,993, filed on Jan. 18, 2010, provisional application No. 61/315,845, filed on Mar. 19, 2010.

(51) Int. Cl.

| | | |
|---|---|---|
| *H01M 4/36* | (2006.01) | |
| *H01M 4/04* | (2006.01) | |
| *H01M 4/134* | (2010.01) | |
| *H01M 4/1395* | (2010.01) | |
| *H01M 4/38* | (2006.01) | |
| *H01M 4/587* | (2010.01) | |
| *H01M 4/62* | (2006.01) | |
| *C01B 32/90* | (2017.01) | |
| *H01B 1/24* | (2006.01) | |
| *H01M 4/583* | (2010.01) | |
| *H01M 10/0525* | (2010.01) | |

(52) U.S. Cl.
CPC ......... *H01M 4/0471* (2013.01); *H01M 4/134* (2013.01); *H01M 4/1395* (2013.01); *H01M 4/364* (2013.01); *H01M 4/386* (2013.01); *H01M 4/48* (2013.01); *H01M 4/583* (2013.01); *H01M 4/587* (2013.01); *H01M 4/625* (2013.01); *H01M 10/0525* (2013.01)

(56) References Cited

U.S. PATENT DOCUMENTS

| | | | |
|---|---|---|---|
| 4,526,610 A | 7/1985 | Miura | |
| 5,429,866 A | 7/1995 | Dubrous | |
| 5,580,834 A * | 12/1996 | Pfaff | F27D 1/0006 |
| | | | 428/689 |
| 5,624,606 A | 4/1997 | Wilson | |
| 5,707,567 A * | 1/1998 | Pfaff | C04B 35/532 |
| | | | 264/29.7 |
| 6,287,728 B1 | 9/2001 | Kajiura | |
| 6,300,013 B1 | 10/2001 | Kamada | |
| 6,413,672 B1 | 7/2002 | Suzuki | |
| 6,432,579 B1 | 8/2002 | Tsuji | |
| 6,436,576 B1 | 8/2002 | Hossain | |
| 6,489,061 B1 | 12/2002 | Hossain | |
| 6,589,696 B2 | 7/2003 | Matsubara | |
| 6,743,549 B1 | 6/2004 | Doyle | |
| 6,770,399 B2 | 8/2004 | Umeno | |
| 6,946,223 B2 | 9/2005 | Kusumoto | |
| 6,949,314 B1 | 9/2005 | Hossain | |
| 7,037,581 B2 | 5/2006 | Aramata | |
| 7,166,550 B2 * | 1/2007 | Chen | C04B 35/632 |
| | | | 501/92 |
| 7,202,000 B2 | 4/2007 | Iriyama | |
| 7,303,838 B2 | 12/2007 | Morita | |
| 7,316,792 B2 | 1/2008 | Kosuzu | |
| 7,615,314 B2 | 11/2009 | Kawakami | |
| 7,670,970 B2 | 3/2010 | Ko | |
| 8,158,285 B2 | 4/2012 | Im | |
| 8,288,039 B2 | 10/2012 | Im | |
| 8,372,549 B2 | 2/2013 | Im | |
| 8,568,650 B2 * | 10/2013 | Suyama | C04B 37/005 |
| | | | 264/682 |
| 8,603,683 B2 | 12/2013 | Park | |
| 8,709,653 B2 | 4/2014 | Lee | |
| 9,178,208 B2 * | 11/2015 | Park | C04B 35/62218 |
| 9,397,338 B2 | 7/2016 | Park | |
| 9,553,303 B2 * | 1/2017 | Park | C01B 32/05 |
| 9,583,757 B2 | 2/2017 | Park | |
| 9,608,262 B2 * | 3/2017 | Aramata | H01M 4/38 |
| 9,620,809 B2 | 4/2017 | Turon Teixidor | |
| 9,647,259 B2 | 5/2017 | Park | |
| 9,806,328 B2 | 10/2017 | Park | |
| 9,941,509 B2 * | 4/2018 | Park | B29C 48/914 |
| 9,997,765 B2 | 6/2018 | Park | |
| 10,103,378 B2 | 10/2018 | Park | |
| 10,461,366 B1 * | 10/2019 | Anderson | H01M 4/58 |
| 2002/0009646 A1 | 1/2002 | Matsubara | |
| 2004/0137327 A1 | 7/2004 | Gross | |
| 2005/0014072 A1 | 1/2005 | Yamaguchi | |
| 2005/0031958 A1 | 2/2005 | Fukuoka | |
| 2005/0089755 A1 | 4/2005 | Matsubara | |
| 2005/0233213 A1 | 10/2005 | Lee | |
| 2006/0003227 A1 | 1/2006 | Aramata | |
| 2006/0035146 A1 | 2/2006 | Hayashi | |
| 2006/0035149 A1 | 2/2006 | Nanba | |
| 2006/0040182 A1 | 2/2006 | Kawakami | |
| 2006/0051670 A1 | 3/2006 | Aramata | |
| 2006/0051675 A1 | 3/2006 | Musha | |
| 2006/0068287 A1 | 3/2006 | Morita | |
| 2006/0127773 A1 | 6/2006 | Kawakami | |
| 2006/0134516 A1 | 6/2006 | Im | |
| 2006/0147799 A1 | 7/2006 | Hayashi | |
| 2006/0147802 A1 | 7/2006 | Yasuda | |
| 2006/0275668 A1 | 12/2006 | Peres | |
| 2007/0054190 A1 | 3/2007 | Fukui | |
| 2007/0072074 A1 | 3/2007 | Yamamoto | |
| 2007/0072084 A1 | 3/2007 | Katsushi | |
| 2007/0077490 A1 | 4/2007 | Kim | |
| 2007/0154811 A1 | 7/2007 | Oh | |
| 2007/0212610 A1 | 9/2007 | Sonobe | |
| 2007/0243469 A1 | 10/2007 | Kim | |
| 2007/0281216 A1 | 12/2007 | Petrat | |
| 2008/0020282 A1 | 1/2008 | Kim | |
| 2008/0102370 A1 | 5/2008 | Kashiwagi | |
| 2008/0145757 A1 | 6/2008 | Mah | |
| 2008/0145761 A1 | 6/2008 | Petrat | |
| 2008/0160409 A1 | 7/2008 | Ishida | |
| 2008/0280207 A1 | 11/2008 | Patoux | |
| 2008/0286657 A1 | 11/2008 | Hasegawa | |
| 2009/0004566 A1 | 1/2009 | Shirane | |
| 2009/0023065 A1 | 1/2009 | Hwang | |
| 2009/0029256 A1 | 1/2009 | Mah | |
| 2009/0053589 A1 | 2/2009 | Obrovac | |
| 2009/0053608 A1 | 2/2009 | Choi | |
| 2009/0087743 A1 | 4/2009 | Kim | |
| 2009/0117467 A1 | 5/2009 | Zhamu | |
| 2009/0117468 A1 | 5/2009 | Eom | |
| 2009/0181304 A1 | 7/2009 | Miyamoto | |
| 2009/0186267 A1 | 7/2009 | Tiegs | |
| 2009/0202911 A1 | 8/2009 | Fukuoka | |
| 2009/0239151 A1 | 9/2009 | Nakanishi | |
| 2009/0283875 A1 | 11/2009 | Garandet | |
| 2009/0305135 A1 | 12/2009 | Shi | |
| 2009/0317722 A1 | 12/2009 | Watanabe | |
| 2010/0078599 A1 | 4/2010 | Kumta | |
| 2010/0143798 A1 | 6/2010 | Zhamu | |
| 2010/0255376 A1 | 10/2010 | Park | |
| 2010/0266902 A1 | 10/2010 | Takano | |
| 2010/0273058 A1 | 10/2010 | Lee | |
| 2011/0020701 A1 | 1/2011 | Park | |
| 2011/0045360 A1 | 2/2011 | Deguchi | |
| 2011/0135558 A1 | 6/2011 | Ma | |
| 2011/0177393 A1 * | 7/2011 | Park | C04B 35/524 |
| | | | 429/231.8 |
| 2011/0244333 A1 | 10/2011 | Kawada | |
| 2012/0094178 A1 | 4/2012 | Loveridge | |
| 2012/0202069 A1 | 8/2012 | Aoki | |
| 2012/0210823 A1 | 8/2012 | Lee | |

(56) References Cited

U.S. PATENT DOCUMENTS

| | | | | |
|---|---|---|---|---|
| 2013/0071750 A1* | 3/2013 | Park | ............... | H01M 10/052 |
| | | | | 429/231.8 |
| 2014/0147751 A1 | 5/2014 | Yang | | |
| 2014/0166939 A1 | 6/2014 | Park | | |
| 2014/0170498 A1 | 6/2014 | Park | | |
| 2014/0295290 A1 | 10/2014 | Park | | |
| 2015/0118567 A1 | 4/2015 | Chen | | |
| 2015/0325848 A1* | 11/2015 | Yamashita | ............ | H01M 4/386 |
| | | | | 429/231.4 |
| 2017/0040598 A1 | 2/2017 | Wang | | |
| 2017/0133664 A1 | 5/2017 | Park | | |
| 2017/0133665 A1 | 5/2017 | Park | | |
| 2017/0133670 A1 | 5/2017 | Park | | |
| 2017/0155126 A1 | 6/2017 | Park | | |
| 2017/0170510 A1 | 6/2017 | Turon Teixidor | | |
| 2017/0279093 A1 | 9/2017 | Park | | |
| 2018/0062154 A1 | 3/2018 | Park | | |
| 2018/0083275 A1* | 3/2018 | Put | ............... | H01M 10/052 |
| 2018/0198114 A1 | 7/2018 | Bonhomme | | |
| 2018/0219211 A1 | 8/2018 | Park | | |
| 2018/0287129 A1 | 10/2018 | Park | | |

FOREIGN PATENT DOCUMENTS

| | | |
|---|---|---|
| CN | 102834955 | 12/2012 |
| EP | 1 054 462 | 11/2000 |
| EP | 1 363 341 | 11/2003 |
| EP | 1 722 429 | 11/2006 |
| EP | 2 113 955 | 11/2009 |
| JP | 2000-173667 | 6/2000 |
| JP | 2000-272911 | 10/2000 |
| JP | 2001-006682 | 1/2001 |
| JP | 2001-160392 | 6/2001 |
| JP | 2003-165715 | 6/2003 |
| JP | 2004-103405 | 4/2004 |
| JP | 2005-285382 | 10/2005 |
| JP | 2007-073334 | 3/2007 |
| JP | 2007-165061 | 6/2007 |
| JP | 2008-153006 | 7/2008 |
| JP | 2009-026760 | 2/2009 |
| KR | 2009-0109225 | 10/2009 |
| WO | 1998/028804 | 7/1998 |
| WO | 2011/088472 | 7/2011 |
| WO | 2012/126338 | 9/2012 |
| WO | 2014/007161 | 1/2014 |
| WO | 2014/158729 | 10/2014 |
| WO | 2017/027263 | 2/2017 |

OTHER PUBLICATIONS

Studart et al., "Processing Routes to Macroporous Ceramics: A Review", Journal of the American Ceramic Society, 2006, vol. 89, No. 6, pp. 1771-1789.
Na et al., "Effect of the average particle size and the surface oxidation layer of silicon on the colloidal silica particle through direct oxidation", Materials Science and Engineering B 163 (2009) 82-87 (Year: 2009).
Zhou et al., "Kinetics Model for the Growth of Silicon Carbide by the Reaction of Liquid Silicon with Carbon", J. Am. Deram. Soc., 78 [9] 2456-62 (1995). (Year: 1995).
Gilman et al., "Chapter 11 Thermal Decomposition Chemistry of Poly(vinyl alcohol)", in Fire and Polymers II Materials and Test for Hazard Prevention, American Chemical Society, ACS Symposium Series 599, Aug. 21-26, 1994, Washington, DC, pp. 161-185.
International Preliminary Report on Patentability and Written Opinion for International Application No. PCT/US2016/045184 (CMBATT. 024WO), dated Feb. 22, 2018 in 8 pages.
"Pitch-based carbon fiber", Wikipedia, https://en.wikipedia.org/wiki/Pitch-based_carbon_fiber, edited Nov. 7, 2017, in 3 pages.
Bogart et al., "High Capacity Lithium Ion Battery Anodes of Silicon and Germanium", Current Opinion in Chemical Engineering, 2013, vol. 2, pp. 1-8.
Choi et al., "Effect of Fluoroethylene Carbonate Additive on Interfacial Properties of Silicon Thin-Film Electrode", Journal of Power Sources, 2006, vol. 161, pp. 1254-1259.
Choi et al., "Enhanced Electrochemical Properties of a Si-based Anode Using an Electrochemically Active Polyamide mide Binder", Journal of Power Sources, 2008, vol. 177, pp. 590-594.
Datta et al., "Silicon, Graphite and Resin Based Hard Carbon Nanocomposite Anodes for Lithium Ion Batteries", Journal of Power Sources, Feb. 10, 2007, vol. 165, No. 1, pp. 368-378.
Hsu, G., "Fines in Fluidized Bed Silane Pyrolysis", Journal of the Electrochemical Society, Mar. 1984, vol. 131, No. 3, pp. 660-663.
Hu et al., "Superior Storage Performance of a Si@SiOx/C Nanocomposite as Anode Material for Lithium-Ion Batteries", Angwandte Chemie International Edition, Feb. 15, 2008, vol. 47, No. 9, pp. 1645-1649.
International Preliminary Report on Patentability and Written Opinion for International Application No. PCT/US2014/019683 (CMBATT. 012P2WO), dated Sep. 24, 2015 in 8 pages.
International Preliminary Report on Patentability for International Application No. PCT/US2011/021585 (CMBATT.003WO), dated Jun. 28, 2012 in 14 pages.
International Search Report and Written Opinion for International Application No. PCT/US2011/021585 (CMBATT.003WO), dated Jul. 26, 2011 in 15 pages.
International Preliminary Report on Patentability and Written Opinion for International Application No. PCT/US2014/019683 (CMBATT. 012P2WO), dated May 30, 2014 in 13 pages.
International Search Report and Written Opinion for International Application No. PCT/US2016/045184 (CMBATT.024WO), dated Oct. 7, 2016 in 11 pages.
Ji et al., "Electrospun Carbon Nanofibers Containing Silicon Particles as an Energy-Storage Medium", Carbon, Nov. 2009, vol. 47, No. 14, pp. 3219-3226.
Lee et al., "Graphene-Silicon Composite for Li-Ion Battery Anodes", https://apps.aiche.org/proccedings/Abstracts.aspx?PaperID=162914, dated Sep. 11, 2009 [Retrieved Jun. 23, 2011].
Lee et al., "Silicon Nanoparticles-Graphene Paper Composites for Li Ion Battery Anodes", Chemical Communications, 2010, vol. 46, No. 12, pp. 2025-2027.
Lin et al., "High Performance Silicon Nanoparticle Anode in Fluoroethylene Carbonate-Based Electrolyte for Li-Ion Batteries", Chemical Communications, 2012, vol. 48, pp. 7268-7270.
Nakai et al., "Investigation of the Solid Electrolyte Interphase Formed by Fluoroethylene Carbonate on Si Electrodes", Journal of the Electrochemical Society, 2011, vol. 158, No. 7, pp. A798-A801.
Seo et al., Stacking Faults in 3-SIC Formed During Carbothermal Reduction of SiO2, Journal of American Ceramic Society, 1996, vol. 79, No. 7, pp. 1777-1782.
Su et al., "Silicon-Based Nanomaterials for Lithium-Ion Batteries: A Review", Advanced Energy Materials, 2014, vol. 4, pp. 1-23.
Sun et al., "Formation of Silicon Carbide Nanotubes and Nanowires via Reaction of Silicon (from Disproportionation of Silicon Monoxide) with Carbon Nanotubes", Journal of the American Ceramic Society, 2002, vol. 124, No. 48, pp. 14464-14471.
Wolf et al., "Carbon-Fiber-Silicon Nanocomposites for Lithium-Ion Battery Anodes by Microwave Plasma Chemical Vapor Deposition", Journal of Power Sources, May 1, 2009, vol. 190, No. 1, pp. 157-161.
Written Opinion for International Application No. PCT/US2011/021585, dated May 3, 2012 in 8 pages.
Zhang et al., "Heterostructures of Single-Walled Carbon Nanotubes and Carbide Nanorods", Science, Sep. 10, 1999, vol. 285, pp. 1719-1722.
Zhang, Sheng Shui, "A Review on Electrolyte Additives for Lithium-Ion Batteries", Journal of Power Sources, 2006, vol. 162, pp. 1379-1394.
Zhang, Wei-Jun , "A Review of the Electrochemical Performance of Alloy Anodes for Lithium-Ion Batteries", Journal of Power Sources, 2011, vol. 196, pp. 13-24.
International Preliminary Report on Patentability for International Application No. PCT/US2011/021585 (CMBATT.003WO), dated Jun. 28, 2012 in 15 pages.

(56) References Cited

OTHER PUBLICATIONS

Lee, Jeong K., et al., Silicon nanoparticles-graphene paper composites for Li ion battery anodes, Chemical Communications, 2010, vol. 46, Issue 12, pp. 2025-2027.
Official Communication in Chinese Patent Application No. 201180012074.1 (CMBATT.003CN), dated May 30, 2014 in 12 pages.
Official Communication in Chinese Patent Application No. 201180012074.1 (CMBATT.003CN), dated Dec. 22, 2014 in 4 pages.
Official Communication in Chinese Patent Application No. 201180012074.1 (CMBATT.003CN), dated Jul. 1, 2015 in 10 pages.
Official Communication in Japanese Patent Application No. 2012-550066 (CMBATT.003JP) dated Aug. 4, 2014 in 2 pages.
Official Communication in Japanese Patent Application No. 2012-550066 (CMBATT.003JP) dated Jan. 5, 2015 in 2 pages.
Official Communication in Japanese Patent Application No. 2012-550066 (CMBATT.003JP) dated Dec. 12, 2016 in 5 pages.
Official Communication in Japanese Patent Application No. 2015-94075 (CMBATT.003JPD1) dated Apr. 11, 2016 in 5 pages.
Official Communication in Japanese Patent Application No. 2015-94075 (CMBATT.003JPD1) dated Dec. 26, 2016 in 3 pages.
Official Communication in Korean Patent Application No. 10-2012-7021430 (CMBATT.003KR) dated Jan. 20, 2016 in 7 pages.
Official Communication in Korean Patent Application No. 10-2012-7021430 (CMBATT.003KR) dated May 19, 2016 in 6 pages.
Non-Final Office Action in U.S. Appl. No. 13/601,976 (CMBATT.012P1), dated Jun. 8, 2015 in 12 pages.
Final Office Action in U.S. Appl. No. 13/601,976 (CMBATT.012P1), dated Oct. 29, 2015 in 15 pages.
Non-Final Office Action in U.S. Appl. No. 13/601,976 (CMBATT.012P1), dated Mar. 11, 2016 in 13 pages.
Non-Final Office Action in U.S. Appl. No. 13/799,405 (CMBATT.012P2), dated Jan. 28, 2015 in 14 pages.
Final Office Action in U.S. Appl. No. 13/799,405 (CMBATT.012P2), dated Jul. 29, 2015 in 11 pages.
Non-Final Office Action in U.S. Appl. No. 13/799,405 (CMBATT.012P2), dated Nov. 5, 2015 in 13 pages.
Final Office Action in U.S. Appl. No. 13/799,405 (CMBATT.012P2), dated Jul. 11, 2016 in 11 pages.
Notice of Allowance in U.S. Appl. No. 13/799,405 (CMBATT.012P2), dated Sep. 12, 2016 n 8 pages.
Official Communication in European Patent Application No. 14712433.3 (CMBATT.012P2EP), dated Nov. 14, 2016 in 7 pages.

\* cited by examiner

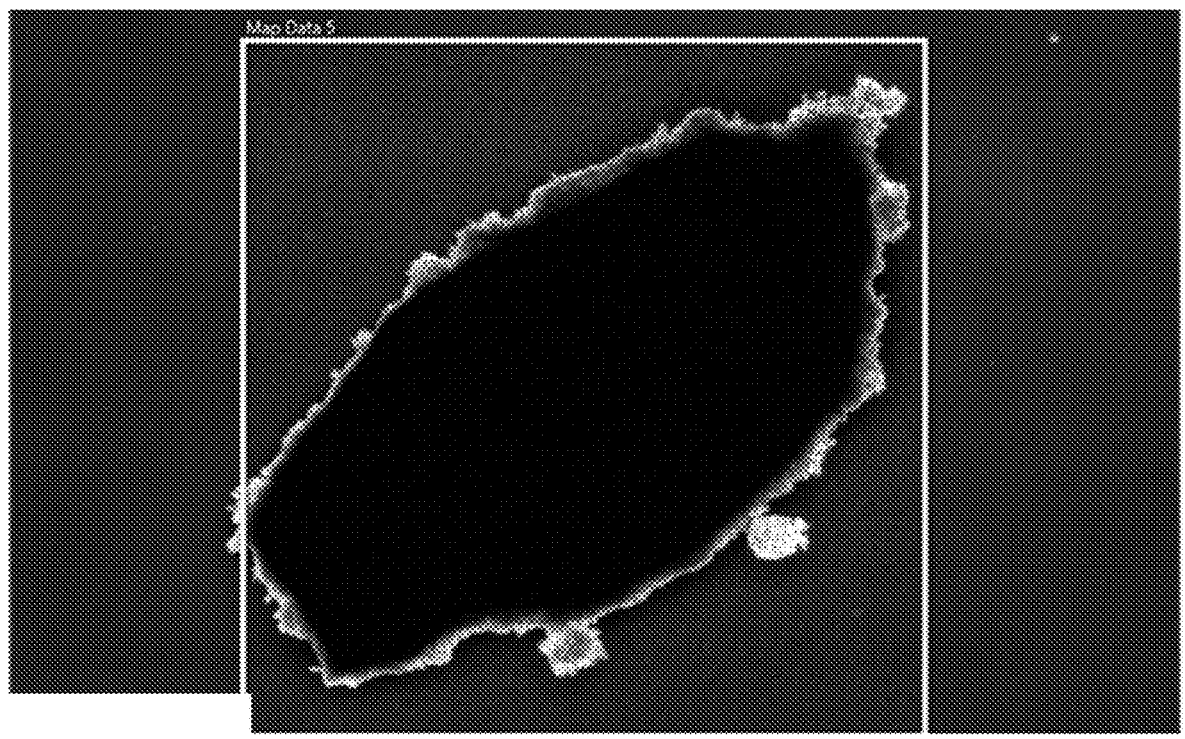
FIG. 13A
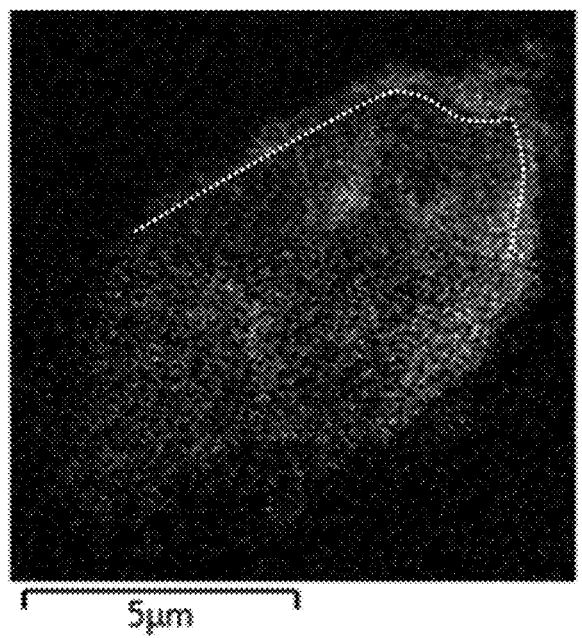 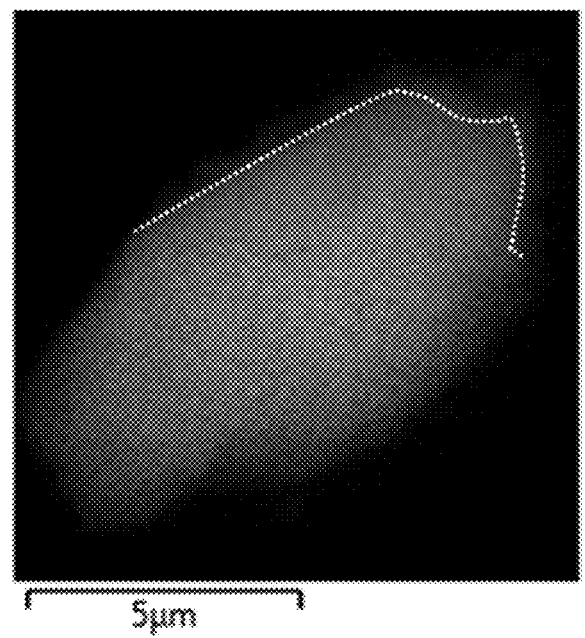
FIG. 13B　　　　FIG. 13C

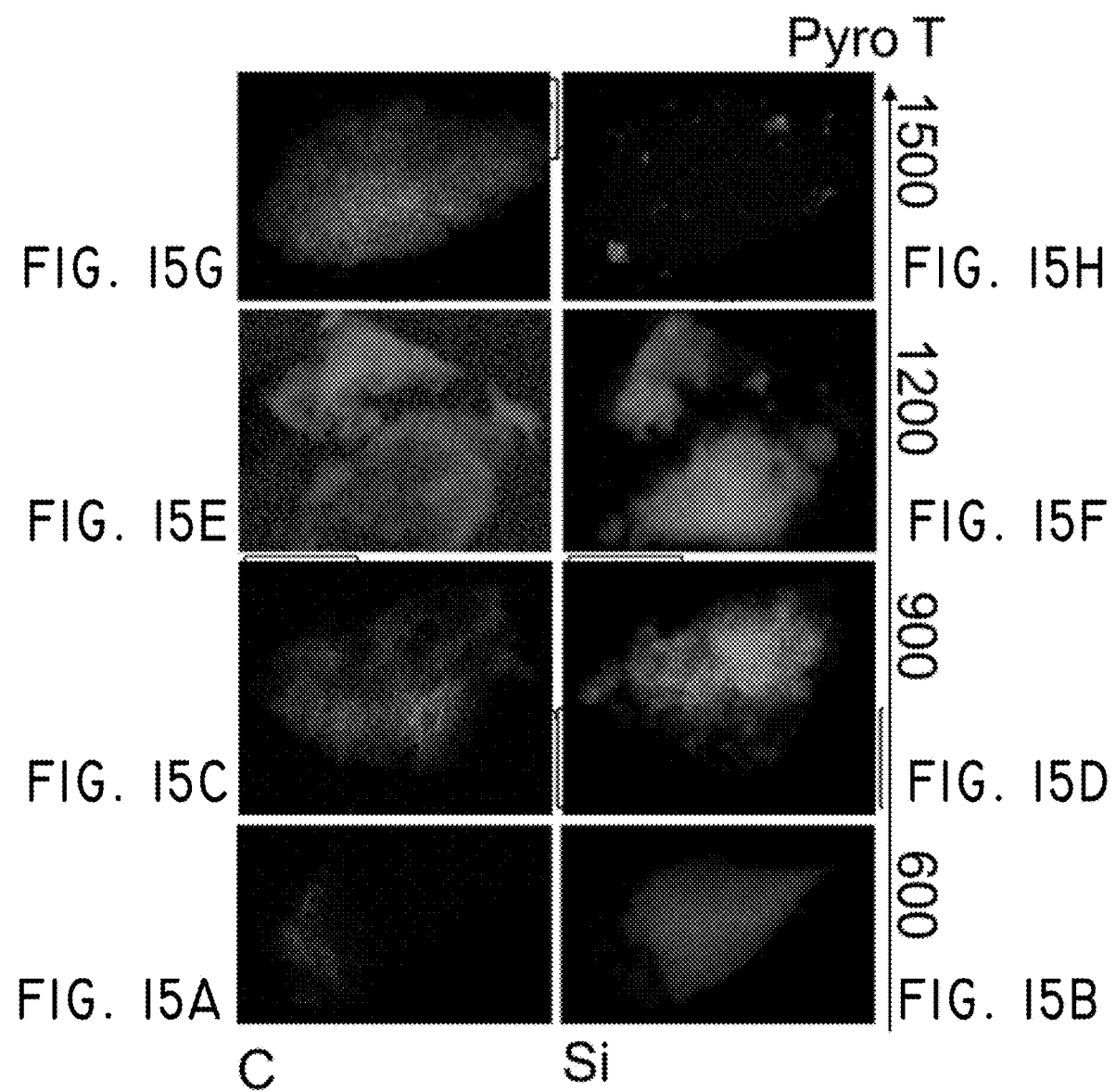

SURFACE MODIFICATION OF SILICON PARTICLES FOR ELECTROCHEMICAL STORAGE

CROSS-REFERENCE TO RELATED APPLICATIONS

This application is a continuation-in-part of U.S. application Ser. No. 15/413,021 filed on Jan. 23, 2017, now U.S. Pat. No. 10,622,620 that issued on Apr. 14, 2020, which is a continuation of U.S. application Ser. No. 13/799,405 filed on Mar. 13, 2013, now U.S. Pat. No. 9,553,303, which is a continuation-in-part of U.S. application Ser. No. 13/601,976 filed on Aug. 31, 2012, now abandoned, which claims benefit of U.S. Provisional Application No. 61/530,881 filed on Sep. 2, 2011. Said application Ser. No. 13/601,976 is also a continuation-in-part of Ser. No. 13/008,800 filed on Jan. 18, 2011, now U.S. Pat. No. 9,178,208, which claims benefit of U.S. Provisional Application No. 61/295,993 filed on Jan. 18, 2010 and U.S. Provisional Application No. 61/315,845 filed on Mar. 19, 2010. The present application is also a continuation of U.S. application Ser. No. 15/886,136, filed Feb. 1, 2018, now U.S. Pat. No. 10,541,412, which is a continuation of U.S. application Ser. No. 14/821,586, filed Aug. 7, 2015, now abandoned, the entirety of each of which is hereby incorporated by reference.

BACKGROUND

Field of the Invention

The present invention relates to composite materials that include silicon and carbon. In particular, the present invention relates to composite materials for use in battery electrodes.

Description of the Related Art

A lithium ion battery typically includes a separator and/or electrolyte between an anode and a cathode. In one class of batteries, the separator, cathode and anode materials are individually formed into sheets or films. Sheets of the cathode, separator and anode are subsequently stacked or rolled with the separator separating the cathode and anode (e.g., electrodes) to form the battery. For the cathode, separator and anode to be rolled, each sheet must be sufficiently deformable or flexible to be rolled without failures, such as cracks, brakes, mechanical failures, etc. Typical electrodes include electro-chemically active material layers on electrically conductive metals (e.g., aluminum and copper). Films can be rolled or cut into pieces which are then layered into stacks. The stacks are of alternating electrochemically active materials with the separator between them.

SUMMARY OF THE INVENTION

In a certain embodiment, a composite material film is provided. The composite material film can include greater than 0% and less than about 90% by weight of silicon particles and greater than 0% and less than about 90% by weight of one or more types of carbon phases. Furthermore, substantially all of the silicon particles have surface coatings comprising silicon carbide or a mixture of carbon and silicon carbide and at least one of the one or more types of carbon phases is a substantially continuous phase.

In some embodiments, the average particle size of the silicon particles may be from about 0.1 μm to about 30 μm. In some embodiments, the silicon particles are from about 90% pure silicon to about 100% pure silicon.

In some embodiments, the surface coatings may include silicon monoxide (SiO), silicon dioxide ($SiO_2$), or silicon oxide ($SiO_x$). In some embodiments, the surface coatings may be a substantially continuous layer.

In some embodiments, the composite material may be self-supported. In some embodiments, at least one of the one or more types of carbon phases that is a substantially continuous phase may be electrochemically active and electrically conductive.

In certain embodiments a lithium-ion battery electrode that includes the composite material described herein is provided.

In certain embodiments, a method of forming a composite material is provided. The method can include providing a mixture comprising a precursor and silicon particles, pyrolyzing the precursor to convert the precursor into one or more types of carbon phases, and forming silicon carbide on at least a portion of silicon particles.

In some embodiments, the silicon carbide and/or one of the one or more types of carbon phases may form substantially continuous layers on the silicon particles. In some embodiments, forming silicon carbide may comprise reacting one of the one or more types of carbon phases with the silicon particles. Furthermore, reacting one of the one or more types of carbon phases with the silicon particles may comprise reacting one or more types of carbon phases with native silicon oxide layers of the silicon particles in some embodiments.

Pyrolyzing the precursor may include heating the mixture to a temperature of about 750° C. to about 1300° C. In some embodiments, pyrolyzing the precursor may include heating the mixture to a temperature of about 800° C. to about 1200° C. In some embodiments pyrolyzing the precursor may include heating the mixture to a temperature of about 1175° C.

In certain embodiments, the method may further include casting the mixture on a substrate, drying the mixture to form a film, removing the film from the substrate, and curing the film in a hot press.

BRIEF DESCRIPTION OF THE DRAWINGS

FIG. 13A illustrates a scanning transmission electron microscopy (STEM) image of a composite anode film pyrolyzed at 1175° C.

FIGS. 13B-C show corresponding energy dispersive spectroscopy (EDS) elemental maps of C and Si of the composite anode film in FIG. 13A.

FIG. 15A-H illustrate EDS maps of composite anode films pyrolyzed at different temperatures.

DETAILED DESCRIPTION

Figure 1:
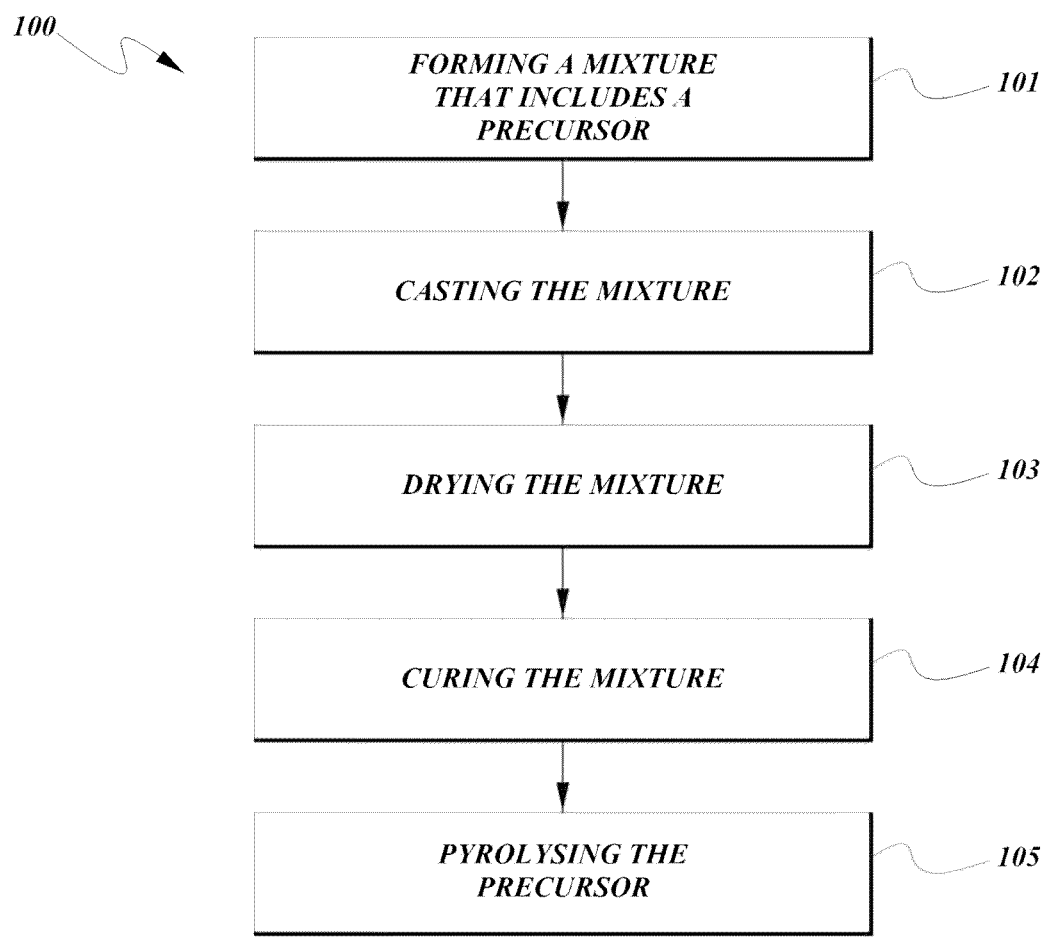
FIG. 1 illustrates an embodiment of a method of forming a composite material that includes forming a mixture that includes a precursor, casting the mixture, drying the mixture, curing the mixture, and pyrolyzing the precursor.

Typical carbon anode electrodes include a current collector such as a copper sheet. Carbon is deposited onto the collector along with an inactive binder material. Carbon is often used because it has excellent electrochemical properties and is also electrically conductive. The carbonized polymer can form a substantially continuous conductive carbon phase in the entire electrode as opposed to particulate carbon suspended in a non-conductive binder in one class of conventional lithium-ion battery electrodes. Advantages of a carbon composite blend that utilizes a carbonized polymer can include, for example, 1) higher capacity, 2) enhanced overcharge/discharge protection, and 3) lower irreversible capacity due to the elimination (or minimization) of metal foil current collectors.

Anode electrodes currently used in the rechargeable lithium-ion cells typically have a specific capacity of approximately 200 milliamp hours per gram (including the metal foil current collector, conductive additives, and binder material). Graphite, the active material used in most lithium ion battery anodes, has a theoretical energy density of 372 milliamp hours per gram (mAh/g). In comparison, silicon has a high theoretical capacity of 4200 mAh/g. Silicon, however, swells in excess of 300% upon lithium insertion. Because of this expansion, anodes including silicon should be able to expand for the silicon to maintain electrical contact.

This application also describes a new method of creating monolithic, self-supported anodes using a carbonized polymer. Because the polymer is converted into an electrically conductive and electrochemically active matrix, the resulting electrode is electrically conductive. The converted polymer also acts as an expansion buffer and/or acts as a rigid matrix holding the electrode together for silicon particles during cycling so that a high cycle life can be achieved. Further, in certain embodiments, converted polymer may react with a native silicon dioxide surface layer on the silicon particles. In some embodiments, the surface of the particles is modified to from a surface coating thereon, which may further act as an expansion buffer for silicon particles during cycling. In certain embodiments, the resulting electrode is an electrode that is comprised substantially of active material. In further embodiments, the resulting electrode is substantially active material. In some embodiments the resulting electrode includes silicon particles having surface coatings comprising silicon carbide. In some embodiments the resulting electrode includes silicon particles having surface coatings comprising carbon and silicon carbide. The electrodes can have a high energy density of between about 500 mAh/g to about 2500 mAh/g that can be due to, for example, 1) the use of silicon, 2) elimination or substantial reduction of metal current collectors, and 3) being comprised entirely (or almost entirely) of active material.

The composite materials described herein can be used as an anode in most conventional lithium ion batteries; they may also be used as the cathode in some electrochemical couples with additional additives. The composite materials can also be used in either secondary batteries (e.g., rechargeable) or primary batteries (e.g., non-rechargeable). In certain embodiments, the composite materials are self-supported structures. In further embodiments, the composite materials are self-supported monolithic structures. For example, a collector may not be included in the electrode comprised of the composite material. In certain embodiments, the composite material can be used to form carbon structures discussed in U.S. patent application Ser. No. 12/838,368 entitled "Carbon Electrode Structures for Batteries," the entirety of which is hereby incorporated by reference. Furthermore, the composite materials described herein can be, for example, silicon composite materials, carbon composite materials, silicon carbide composite materials and/or silicon-carbon-silicon carbide composite materials.

FIG. 1 illustrates one embodiment of a method of forming a composite material 100. For example, the method of forming a composite material can include forming a mixture including a precursor, block 101. The method can further include pyrolyzing the precursor to convert the precursor to a carbon phase. The precursor mixture may include carbon additives such as graphene, graphite active material, chopped or milled carbon fiber, carbon nanofibers, carbon nanotubes, activated carbon, carbide derived carbon and/or other carbons. After the precursor is pyrolyzed, the resulting carbon material can be a self-supporting monolithic structure. In certain embodiments, one or more materials are added to the mixture to form a composite material. For example, silicon particles can be added to the mixture. The carbonized precursor results in an electrochemically active structure that holds the composite material together. For example, the carbonized precursor can be a substantially continuous phase. The silicon particles may be distributed throughout the composite material. The pyrolyzed precursor may form surface coatings on the silicon particles distributed throughout the composite material. Such surface coatings may comprise silicon carbide, carbon, and/or a mixture of silicon carbide and carbon. Advantageously, the carbonized precursor can be a structural material as well as an electro-chemically active and electrically conductive material. In certain embodiments, material particles added to the mixture are homogenously or substantially homogeneously distributed throughout the composite material to form a homogeneous or substantially homogeneous composite.

The mixture can include a variety of different components. The mixture can include one or more precursors. In certain embodiments, the precursor is a hydrocarbon compound. For example, the precursor can include polyamic acid, polyimide, etc. Other precursors can include phenolic resins, epoxy resins, and/or other polymers. The mixture can further include a solvent. For example, the solvent can be N-methyl-pyrrolidone (NMP). Other possible solvents include acetone, diethyl ether, gamma butyrolactone, isopropanol, dimethyl carbonate, ethyl carbonate, dimethoxyethane, ethanol, methanol, etc. Examples of precursor and solvent solutions include PI-2611 (HD Microsystems), PI-5878G (HD Microsystems) and VTEC PI-1388 (RBI, Inc.). PI-2611 is comprised of >60% n-methyl-2-pyrrolidone and 10-30% s-biphenyldianhydride/p-phenylenediamine. PI-5878G is comprised of >60% n-methylpyrrolidone, 10-30% polyamic acid of pyromellitic dianhydride/oxydianiline, 10-30% aromatic hydrocarbon (petroleum distillate) including 5-10% 1,2,4-trimethylbenzene. In certain embodiments, the amount of precursor in the solvent is about 10 wt. % to about 30 wt. %. Additional materials can also be included in the mixture. For example, as previously discussed, silicon particles or carbon particles including graphite active material, chopped or milled carbon fiber, carbon nanofibers, carbon nanotubes, graphene, activated carbons, and other conductive carbons can be added to the mixture. In addition, the mixture can be mixed to homogenize the mixture.

In certain embodiments, the mixture is cast on a substrate, block 102 in FIG. 1. In some embodiments, casting includes using a gap extrusion or a blade casting technique. The blade casting technique can include applying a coating to the substrate by using a flat surface (e.g., blade) which is controlled to be a certain distance above the substrate. A liquid or slurry can be applied to the substrate, and the blade can be passed over the liquid to spread the liquid over the substrate. The thickness of the coating can be controlled by the gap between the blade and the substrate since the liquid passes through the gap. As the liquid passes through the gap, excess liquid can also be scraped off. For example, the mixture can be cast on a substrate comprising a polymer sheet, a polymer roll, and/or foils or rolls made of glass or metal. The mixture can then be dried to remove the solvent, block 103. For example, a polyamic acid and NMP solution can be dried at about 110° C. for about 2 hours to remove the NMP solution. The dried mixture can then be removed from the substrate. For example, an aluminum substrate can be etched away with HCl. Alternatively, the dried mixture can be removed from the substrate by peeling or otherwise mechanically removing the dried mixture from the substrate. In some embodiments, the substrate comprises polyethylene terephthalate (PET), including for example Mylar®. In certain embodiments, the dried mixture is a film or sheet. In some embodiments, the dried mixture is cured, block 104. A hot press can be used to cure and to keep the dried mixture flat. For example, the dried mixture from a polyamic acid and NMP solution can be hot pressed at about 200° C. for about 8 to 16 hours. Alternatively, the entire process including casting and drying can be done as a roll-to-roll process using standard film-handling equipment. The dried mixture can be rinsed to remove any solvents or etchants that may remain. For example, de-ionized (DI) water can be used to rinse the dried mixture. In certain embodiments, tape casting techniques can be used for the casting. In other embodiments, there is no substrate for casting and the anode film does not need to be removed from any substrate. The dried mixture may be cut or mechanically sectioned into smaller pieces.

The mixture further goes through pyrolysis to convert the precursor to carbon, block 105. In some embodiments, the resultant carbon further modifies the silicon particle surface during pyrolysis. In certain embodiments, the mixture is pyrolyzed in an inert atmosphere. For example, an inert atmosphere, a vacuum and/or flowing argon, nitrogen, or helium gas can be used. In certain embodiments, the mixture is pyrolyzed in a reducing atmosphere. For example, a reducing atmosphere, a vacuum and/or flowing gas including $H_2$, CO, or hydrocarbon gas can be used. In some embodiments, the mixture is heated to about 750° C. to about 1350° C. In some embodiments, the mixture is heated to about 800° C. to about 1200° C. In some embodiments, the mixture is heated to about 1175° C. For example, polyimide formed from polyamic acid can be carbonized at about 1175° C. for about one hour. In certain embodiments, the heat up rate and/or cool down rate of the mixture is about 10° C./min. A holder may be used to keep the mixture in a particular geometry. The holder can be graphite, metal, etc. In certain embodiments, the mixture is held flat. After the mixture is pyrolyzed, tabs can be attached to the pyrolyzed material to form electrical contacts. For example, nickel, copper or alloys thereof can be used for the tabs.

In certain embodiments, one or more of the methods described herein can be carried out in a continuous process. In certain embodiments, casting, drying, curing and pyrolysis can be performed in a continuous process. For example, the mixture can be coated onto a glass or metal cylinder. The mixture can be dried while rotating on the cylinder to create a film. The film can be transferred as a roll or peeled and fed into another machine for further processing. Extrusion and other film manufacturing techniques known in industry could also be utilized prior to the pyrolysis step.

Pyrolysis of the precursor results in a carbon material (e.g., at least one carbon phase). In certain embodiments, the carbon material is a hard carbon. In some embodiments, the precursor is any material that can be pyrolyzed to form a hard carbon. When the mixture includes one or more additional materials or phases in addition to the carbonized precursor, a composite material can be created. In particular, the mixture can include silicon particles creating a silicon-carbon (e.g., at least one first phase comprising silicon and at least one second phase comprising carbon) or silicon-carbon-carbon (e.g., at least one first phase comprising silicon, at least one second phase comprising carbon, and at least one third phase comprising carbon) composite material.

Silicon particles can increase the specific lithium insertion capacity of the composite material. Thus, silicon particles may be used in battery electrodes (e.g., anode and cathodes). Anode electrodes currently used in the rechargeable lithium-ion cells typically have a specific capacity of approximately 200 milliamp hours per gram (including the metal foil current collector, conductive additives, and binder material). Graphite, the active material used in most lithium ion battery anodes, has a theoretical energy density of 372 milliamp hours per gram (mAh/g). In comparison, silicon has a high theoretical capacity of 4200 mAh/g. Silicon, however, swells in excess of 300% upon lithium insertion. When silicon absorbs lithium ions, it experiences a large volume increase on the order of 300+ volume percent which can cause electrode structural integrity issues.

In addition to volumetric expansion related problems, silicon is not inherently electrically conductive, but becomes conductive when it is alloyed with lithium (e.g., lithiation). When silicon de-lithiates, the surface of the silicon loses electrical conductivity. Furthermore, when silicon de-lithiates, the volume decreases which results in the possibility of the silicon particle losing contact with the matrix. The dramatic change in volume also results in mechanical failure of the silicon particle structure, in turn, causing it to pulverize. Pulverization and loss of electrical contact have made it a challenge to use silicon as an active material in lithium-ion batteries. In view of the silicon expansion, ideal anodes including silicon should be able to expand while allowing for the silicon to maintain electrical contact with the silicon.

Some embodiments provide silicon particles that can be used as an electro-chemically active material in an electrode. The electrode may include binders and/or other electro-chemically active materials in addition to the silicon particles. For example, the silicon particles described herein can be used as the silicon particles in the composite materials described herein. In another example, an electrode can have an electro-chemically active material layer on a current collector, and the electro-chemically active material layer includes the silicon particles. The electro-chemically active material may also include one or more types of carbon.

Advantageously, the silicon particles described herein can improve performance of electro-chemically active materials such as improving capacity and/or cycling performance. Furthermore, electro-chemically active materials having such silicon particles may not significantly degrade as a result of lithiation of the silicon particles.

A reduction in the initial size of the silicon particles can prevent further pulverization of the silicon powder as well as minimizing the loss of surface electrical conductivity. Furthermore, adding material to the composite that can elastically deform with the change in volume of the silicon particles can ensure that electrical contact to the surface of the silicon is not lost. For example, the composite material can include carbons such as graphite which contributes to the ability of the composite to absorb expansion and which is also capable of intercalating lithium ions adding to the storage capacity of the electrode (e.g., chemically active). Therefore, the composite material may include one or more types of carbon phases.

In some embodiments, a largest dimension of the silicon particles can be less than about 40 µm, less than about 1 µm, between about 10 nm and about 40 µm, between about 10 nm and about 1 µm, less than about 500 nm, less than about 100 nm, and about 100 nm. All, substantially all, or at least some of the silicon particles may comprise the largest dimension described above. For example, an average or median largest dimension of the silicon particles can be less than about 40 µm, less than about 1 µm, between about 1 µm and about 15 µm, between about 100 nm and about 10 µm, between about 10 nm and about 40 µm, between about 10 nm and about 1 µm, between about 100 nm and about 10 µm, less than about 500 nm, less than about 100 nm, and about 100 nm. Silicon particles of various sizes can be separated by various methods such as by air classification, sieving or other screening methods. For example, a mesh size of 325 can be used separate particles that have a particle size less than about 44 µm from particles that have a particle size greater than about 44 µm.

Furthermore, the silicon particles may have a distribution of particle sizes. For example, at least about 90% of the particles may have particle size, for example a diameter or a largest dimension, between about 10 nm and about 40 µm, between about 1 µm and about 15 µm, between about 10 nm and about 1 µm, and/or larger than 200 nm.

In some embodiments, the silicon particles may have an average surface area per unit mass of between about 1 to about 100 m$^2$/g, about 1 to about 80 m$^2$/g, about 1 to about 60 m$^2$/g, about 1 to about 50 m$^2$/g, about 1 to about 30 m$^2$/g, about 1 to about 10 m$^2$/g, about 1 to about 5 m$^2$/g, about 2 to about 4 m$^2$/g, or less than about 5 m$^2$/g.

Compared with the silicon particles used in conventional electrodes, the silicon particles described herein generally have a larger average particle size. In some embodiments, the average surface area of the silicon particles described herein is generally smaller. Without being bound to any particular theory, the lower surface area of the silicon particles described herein may contribute to the enhanced performance of electrochemical cells. Typical lithium ion type rechargeable battery anodes would contain nano-sized silicon particles. In an effort to further increase the capacity of the cell, smaller silicon particles (such as those in nano-size ranges) are being used for making the electrode active materials. In some cases, the silicon particles are milled to reduce the size of the particles. Sometimes the milling may result in roughened or scratched particle surface, which also increases the surface area. However, the increased surface area of silicon particles may actually contribute to increased degradation of electrolytes, which lead to increased irreversible capacity loss.

The amount of silicon in the composite material can be greater than zero percent by weight of the mixture and composite material. In certain embodiments, the mixture comprises an amount of silicon, the amount being within a range of from about 0% to about 90% by weight, including from about 30% to about 80% by weight of the mixture. The amount of silicon in the composite material can be within a range of from about 0% to about 35% by weight, including from about 0% to about 25% by weight, from about 10% to about 35% by weight, and about 20% by weight. In further certain embodiments, the amount of silicon in the mixture is at least about 30% by weight. Additional embodiments of the amount of silicon in the composite material include more than about 50% by weight, between about 30% and about 80% by weight, between about 50% and about 70% by weight, and between about 60% and about 80% by weight. Furthermore, the silicon particles may or may not be pure silicon. For example, the silicon particles may be substantially silicon or may be a silicon alloy. In one embodiment, the silicon alloy includes silicon as the primary constituent along with one or more other elements.

In certain embodiments, the silicon particles are at least partially crystalline, substantially crystalline, and/or fully crystalline. Furthermore, the silicon particles may be substantially pure silicon. In some embodiments the silicon particles may be from about 90% pure silicon to about 100% pure silicon. The silicon particles may comprise a naturally occurring native oxide layer thereon. This native oxide layer is present on the surface of the silicon particles and may result from a reaction between the silicon particle and oxygen present in the ambient environment. In some embodiments the native oxide layer may comprise at least one of silicon monoxide (SiO), silicon dioxide ($SiO_2$), and silicon oxide ($SiO_x$).

The amount of carbon obtained from the precursor can be about 50 weight percent from polymers such as polyimide. In certain embodiments, the amount of carbon from the precursor in the composite material is about 10% to about 25% by weight. The carbon from the precursor can be hard carbon. Hard carbon can be a carbon that does not convert into graphite even with heating in excess of 2800 degrees Celsius. Precursors that melt or flow during pyrolysis convert into soft carbons and/or graphite with sufficient temperature and/or pressure. Hard carbon may be selected since soft carbon precursors may flow and soft carbons and graphite are mechanically weaker than hard carbons. Other possible hard carbon precursors can include phenolic resins, epoxy resins, and other polymers that have a very high melting point or are crosslinked. In some embodiments, the amount of hard carbon in the composite material has a value within a range of from about 10% to about 25% by weight, about 20% by weight, or more than about 50% by weight. In certain embodiments, the hard carbon phase is substantially amorphous. In other embodiments, the hard carbon phase is substantially crystalline. In further embodiments, the hard carbon phase includes amorphous and crystalline carbon. The hard carbon phase can be a matrix phase in the composite material. The hard carbon can also be embedded in the pores of the additives including silicon. The hard carbon may react with some of the additives to create some materials at interfaces. For example, there may be a silicon carbide layer between silicon particles and the hard carbon.

In certain embodiments heating the mixture to a desired pyrolysis temperature may further result in the surface modification of silicon particles present in the mixture. In some embodiments pyrolysis of the mixture may result in the formation of a surface coating on at least 50% of the silicon particles present in the mixture. In some embodiments pyrolysis of the mixture may result in the formation of a surface coating on at least 60%, 70%, 80%, 90% or 99% of the silicon particles present in the mixture. In some embodiments, the surface coatings form a substantially continuous layer on the silicon particles.

In some embodiments, the carbonized precursor or resin may contact the surface of the silicon particles. In certain embodiments, the carbonized precursor in contact with the silicon particle surface may be one or more types of carbon phases resulting from pyrolysis of the precursor. The one or more types of carbon phases of the carbonized precursor in contact with the silicon particle surface may react with the silicon particles during pyrolysis to thereby form silicon carbide on the silicon particle surface. Therefore, in some embodiments, the surface coatings may comprise carbon, silicon carbide, and/or a mixture of carbon and silicon carbide.

In some embodiments, as described further below, the silicon particles present in the mixture may comprise a native silicon oxide (SiO, $SiO_2$, $SiO_x$) surface layer. In certain embodiments, the carbonized precursor in contact with the silicon particle surface may react with the naturally occurring native silicon oxide surface layer to form silicon carbide. In some embodiments the carbonized precursor in contact with the silicon particle surface may react with substantially all of the native silicon oxide layer to form silicon carbide. Therefore, the surface coatings on the silicon particles may comprise, in some embodiments, carbon and silicon carbide, wherein the surface coating is substantially free of silicon oxide. In some embodiments a first portion of the surface coatings may comprise silicon carbide while a second portion may comprise a mixture of silicon carbide and carbon. In some other embodiments, the carbonized precursor in contact with the silicon particle surface may not fully convert the native silicon oxide layer to silicon carbide, and the resultant surface coating or coatings may comprise carbon, silicon carbide, and one or more silicon oxides, such as SiO, $SiO_2$, and $SiO_x$. In some embodiments, the carbonized precursor in contact with the silicon particle surface may be completely reacted, resulting in surface coatings that comprise silicon carbide. In some embodiments substantially all of the surface coatings may comprise silicon carbide. In some embodiments, such surface coatings may be substantially free of silicon oxide and/or carbon.

In certain embodiments, the pyrolyzed mixture can include silicon particles having carbon and/or silicon carbide surface coatings creating a silicon-carbon-silicon carbide (e.g., at least one first phase comprising silicon, at least one second phase comprising carbon, and at least a third phase comprising silicon carbide) or silicon-carbon-carbon-silicon carbide (e.g., at least one first phase comprising silicon, at least one second phase comprising carbon, at least one third phase comprising carbon, and at least a fourth phase comprising silicon carbide) composite material.

Additionally, surface coatings on the silicon particles described herein can help to constrain the outward expansion of the silicon particle during lithiation. By constraining outward particle expansion during lithiation, the surface coatings can help prevent mechanical failure of the silicon particles and ensure good electrical contact. The surface coatings can further enhance the electronic charge transfer within the electrode. Controlled and optimized surface modification of silicon particles in the anode may also significantly improve capacity retention during cycling of an associated battery cell.

Moreover, the surface coatings substantially affect the reactions that occur between the anode materials and the electrolyte within a battery. The surface coatings can help reduce unwanted reactions. During high temperature pyrolysis, the formed surface coatings and the removal of unwanted native oxide ($SiO_2$) via conversion into more stable and unreactive SiC can provide higher reversible capacity with minimized irreversible capacity loss. Irreversible capacity loss can be due to formation and build-up of a solid electrolyte interface (SEI) layer that consumes lithium. This becomes a more prominent issue for silicon particles because nano- and micro-scale silicon particles have large surface areas and larger silicon particles tend to pulverize during lithiation and delithiation which can introduce additional particle surface area. Additionally, irreversible capacity loss can be due to the reaction of lithium with undesirable native silicon oxides (Equation 1) which are unavoidable during processing and storage of silicon anode materials.

$$SiO_x + yLi + ye^- \rightarrow Si + Li_yO_x \qquad \text{(Equation 1)}$$

Therefore, the surface modification of the silicon particles by carbon and/or silicon carbide may aid in the formation of a relatively stable solid electrolyte interface layer and may reduce or eliminate the undesirable reaction of lithium with native silicon oxides on the Si particle surface (Equation 1).

Figure 2:
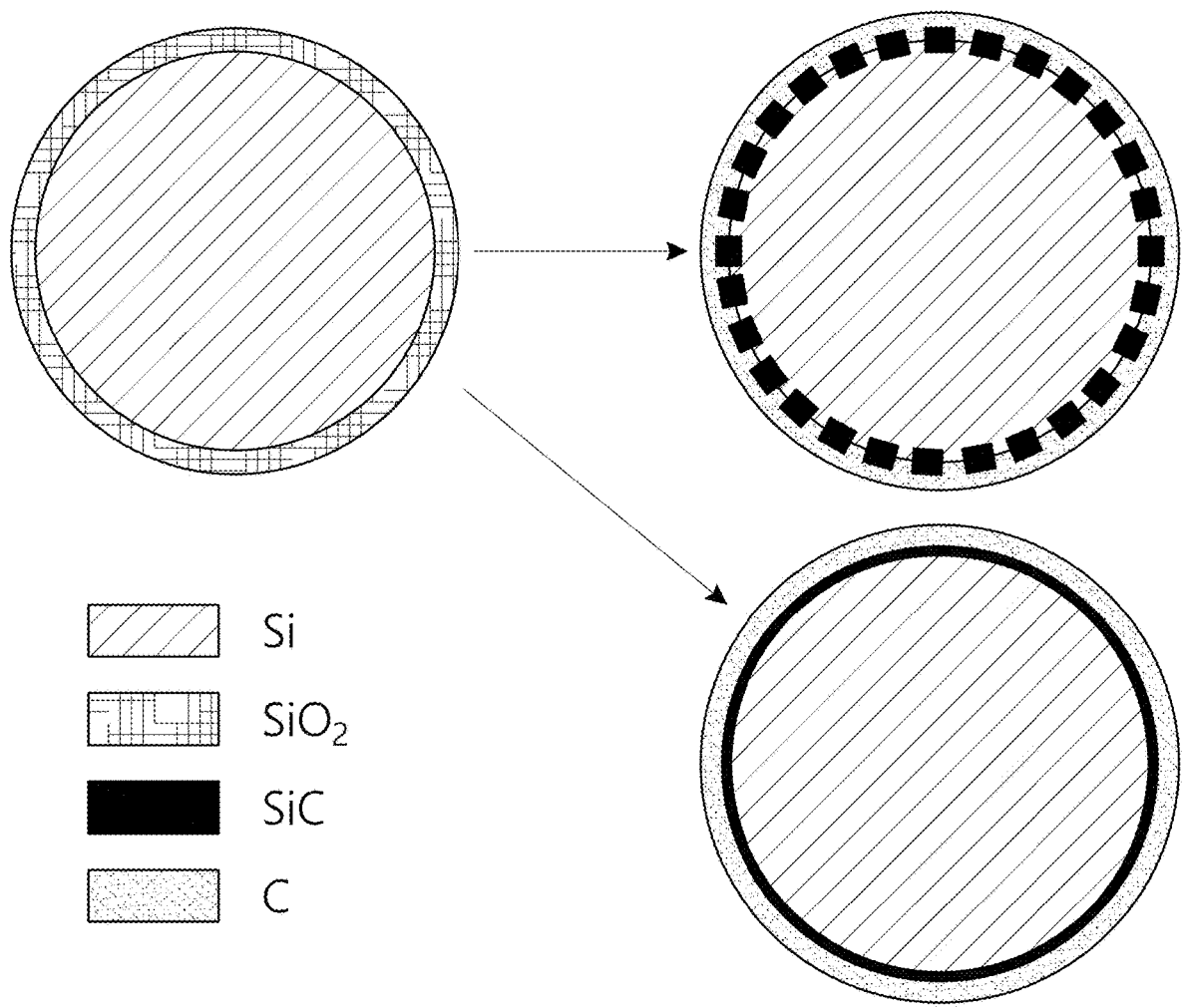
FIG. 2 is a schematic illustration of the formation of silicon carbide on a silicon particle.
Figure 21:
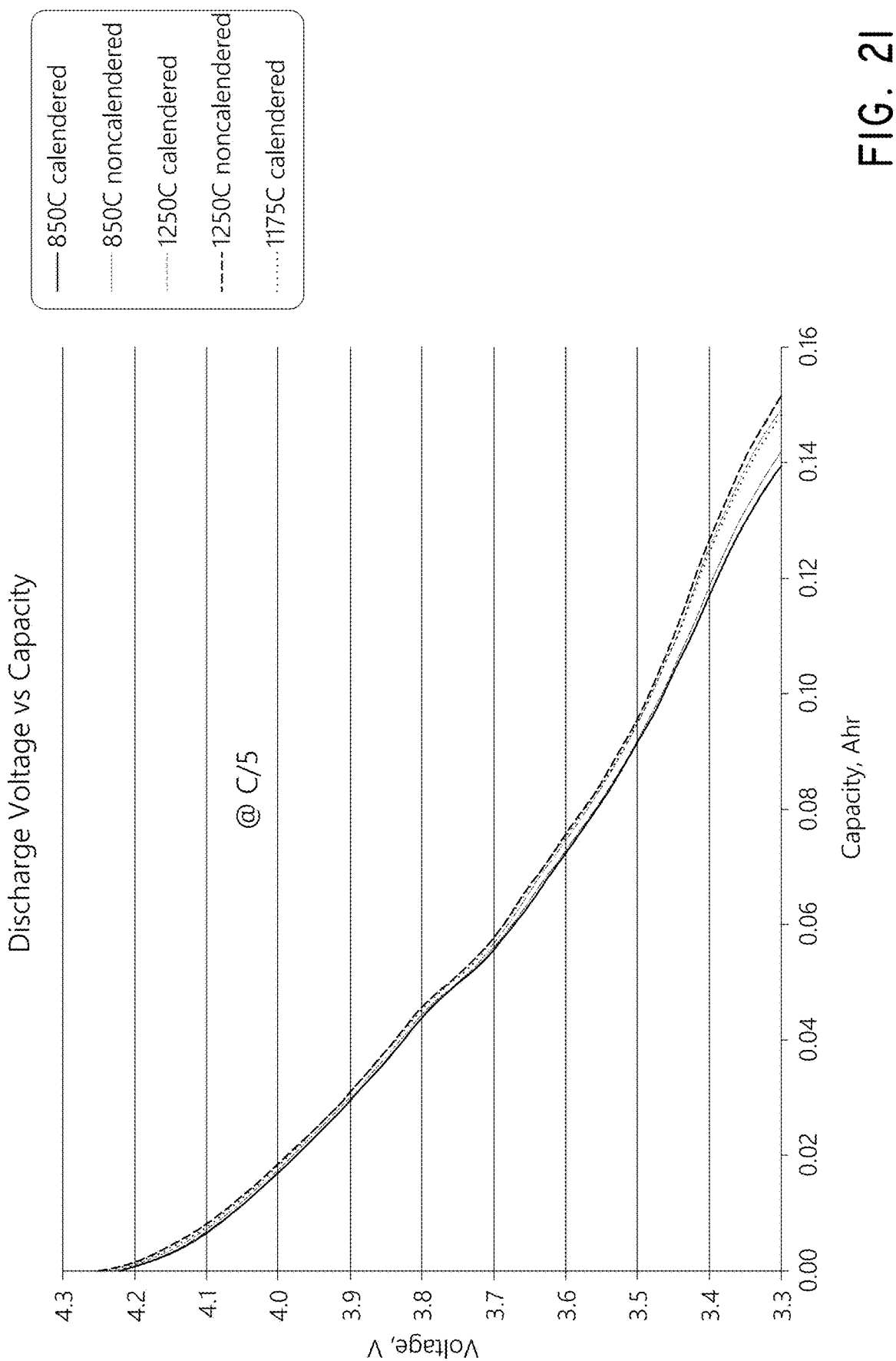
FIG. 21 illustrates the discharge voltage profiles of composite anode films pyrolyzed at different temperatures.

FIG. 2 is a schematic illustration of the formation of silicon carbide on a silicon particle as described above. Initially, a silicon particle comprising a native silicon oxide surface layer is provided in a mixture comprising a precursor as described above. The pyrolyzed precursor in contact with the surface of the silicon particle reacts with the native silicon oxide layer of the silicon particle to form silicon carbide. The carbonized precursor in contact with the silicon particle surface is depicted here as continuous and conformal, but may not be continuous or conformal in some other embodiments. Further, in some embodiments, the silicon carbide layer formed from the reaction between the native silicon oxide layer and the carbonized precursor in contact with the silicon particle surface may take the form of a coating or dispersion within the composite anode film. As shown in FIG. 21, in some embodiments the silicon carbide may not be continuous or conformal on the silicon particle, however in some other embodiments the silicon carbide may be a continuous and/or conformal coating.

In certain embodiments, graphite particles are added to the mixture. Advantageously, graphite can be an electrochemically active material in the battery as well as an elastic deformable material that can respond to volume change of the silicon particles. Graphite is the preferred active anode material for certain classes of lithium-ion batteries currently on the market because it has a low irreversible capacity. Additionally, graphite is softer than hard carbon and can better absorb the volume expansion of silicon additives. In certain embodiments, a largest dimension of the graphite particles is between about 0.5 microns and about 20 microns. All, substantially all, or at least some of the graphite particles may comprise the largest dimension described herein. In further embodiments, an average or median largest dimension of the graphite particles is between about 0.5 microns and about 20 microns. In certain embodiments, the mixture includes greater than 0% and less than about 80% by weight of graphite particles. In further embodiments, the composite material includes about 40% to about 75% by weight graphite particles.

In certain embodiments, conductive particles which may also be electrochemically active are added to the mixture. Such particles can enable both a more electronically conductive composite as well as a more mechanically deformable composite capable of absorbing the large volumetric change incurred during lithiation and de-lithiation. In certain embodiments, a largest dimension of the conductive particles is between about 10 nanometers and about 7 millimeters. All, substantially all, or at least some of the conductive particles may comprise the largest dimension described herein. In further embodiments, an average or median largest dimension of the conductive particles is between about 10 nm and about 7 millimeters. In certain embodiments, the mixture includes greater than zero and up to about 80% by weight conductive particles. In further embodiments, the composite material includes about 45% to about 80% by weight conductive particles. The conductive particles can be conductive carbon including carbon blacks, carbon fibers, carbon nanofibers, carbon nanotubes, etc. Many carbons that are considered as conductive additives that are not electrochemically active become active once pyrolyzed in a polymer matrix. Alternatively, the conductive particles can be metals or alloys including copper, nickel, or stainless steel.

In certain embodiments, an electrode can include a composite material described herein. For example, a composite material can form a self-supported monolithic electrode. The pyrolyzed carbon phase (e.g., hard carbon phase) of the composite material can hold together and structurally support the particles that were added to the mixture. In certain embodiments, the self-supported monolithic electrode does not include a separate collector layer and/or other supportive structures. In some embodiments, the composite material and/or electrode does not include a polymer beyond trace amounts that remain after pyrolysis of the precursor. In further embodiments, the composite material and/or electrode does not include a non-electrically conductive binder. The composite material may also include porosity. For example, the porosity can be about 5% to about 70%, about 5% to about 20%, about 5% to about 40%, about 30% to about 60%, or 40% to about 70% by volume porosity.

The composite material may also be formed into a powder. For example, the composite material can be ground into a powder. The composite material powder can be used as an active material for an electrode. For example, the composite material powder can be deposited on a collector in a manner similar to making a conventional electrode structure, as known in the industry.

In certain embodiments, an electrode in a battery or electrochemical cell can include a composite material described herein. For example, the composite material can be used for the anode and/or cathode. In certain embodiments, the battery is a lithium ion battery. In further embodiments, the battery is a secondary battery, or in other embodiments, the battery is a primary battery.

Furthermore, the full capacity of the composite material may not be utilized during use of battery to improve life of the battery (e.g., number charge and discharge cycles before the battery fails or the performance of the battery decreases below a usability level). For example, a composite material with about 70% by weight silicon particles, about 20% by weight carbon from a precursor, and about 10% by weight graphite may have a maximum gravimetric capacity of about 2000 to 3000 mAh/g, while the composite material may only be used up to an gravimetric capacity of about 550 to about 1600 mAh/g. Although, the maximum gravimetric capacity of the composite material may not be utilized, using the composite material at a lower capacity can still achieve a higher capacity than certain lithium ion batteries. In certain embodiments, the composite material is used or only used at a gravimetric capacity below about 70% of the composite material's maximum gravimetric capacity. For example, the composite material is not used at a gravimetric capacity above about 70% of the composite material's maximum gravimetric capacity. In further embodiments, the composite material is used or only used at a gravimetric capacity below about 50% of the composite material's maximum gravimetric capacity or below about 30% of the composite material's maximum gravimetric capacity.

EXAMPLES

The below example processes for anode fabrication generally include mixing components together, casting those components onto a removable substrate, drying, curing, removing the substrate, then pyrolyzing the resulting samples to form anodes. N-Methyl-2-pyrrolidone (NMP) was typically used as a solvent to modify the viscosity of any mixture and render it castable using a doctor blade approach.

Figure 3:
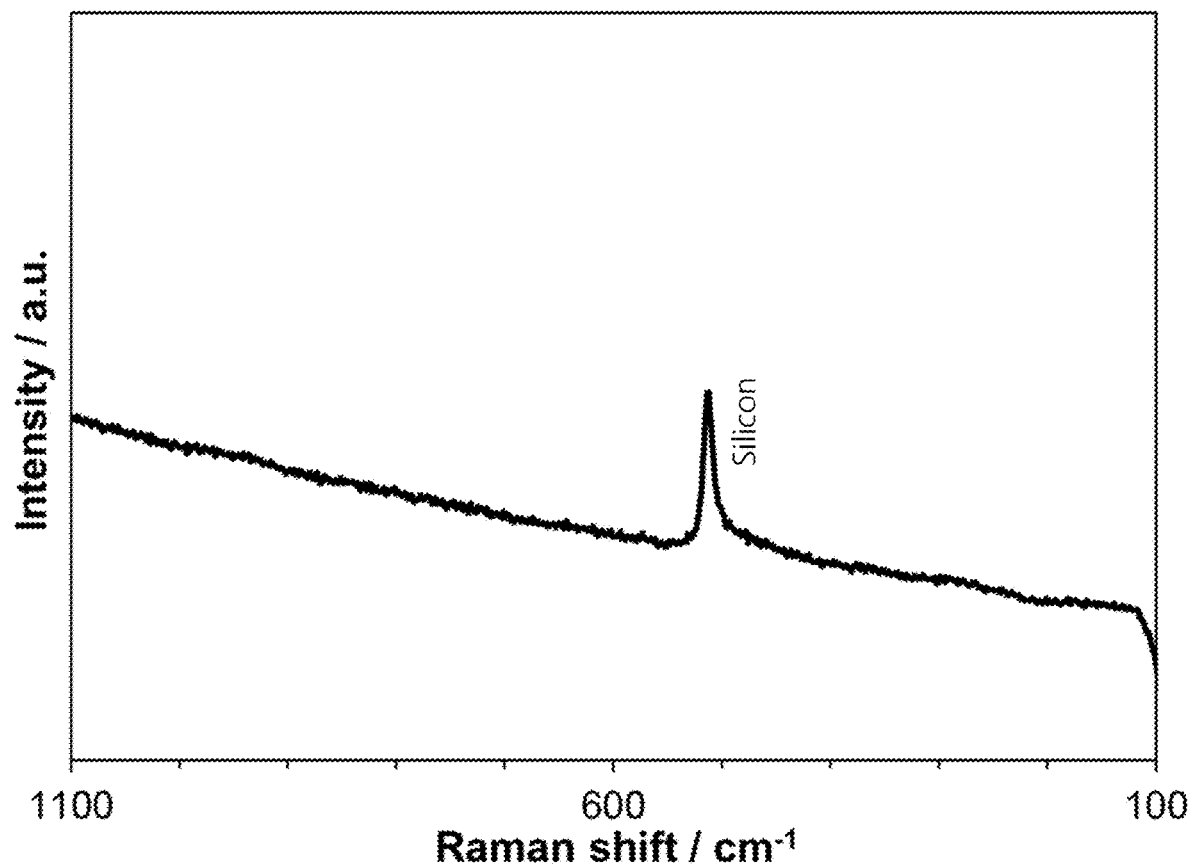
FIG. 3 illustrates the Raman spectrum of a composite anode film before pyrolysis.

Sample carbon and silicon composite anode films were prepared according to methods described herein. The sample anode films were then pyrolyzed under a range of temperatures; 600° C., 850° C., 900° C., 1175° C., 1200° C., and 1500° C. A sample anode film was also left unpyrolyzed. The composition of the various samples was then analyzed using Raman spectroscopy. FIG. 3 illustrates the Raman spectrum of a sample composite anode film before pyrolysis. The Raman spectrum shows a Si peak centered around 520 $cm^{-1}$. In contrast, the Raman spectrum features collected from samples pyrolyzed between 600° C. and 1500° C., illustrated in FIGS. 4-9, demonstrate the existence of carbonaceous material, as is clearly indicated by the presence of the intense D band centered around 1340 cm$^{-1}$ and the G band centered around 1572 cm$^{-1}$.

Figure 4:
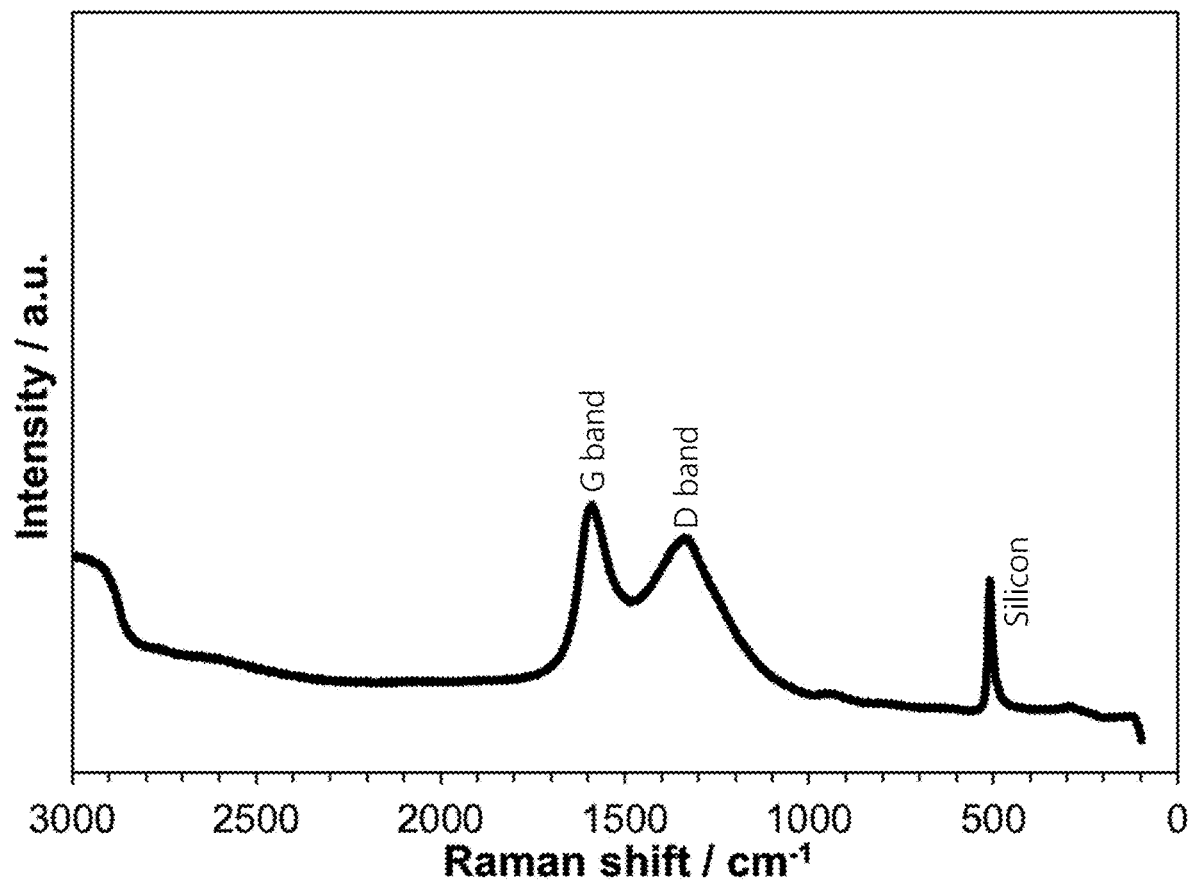
FIG. 4 illustrates the Raman spectrum of a composite anode film pyrolyzed at 600° C.
Figure 5:
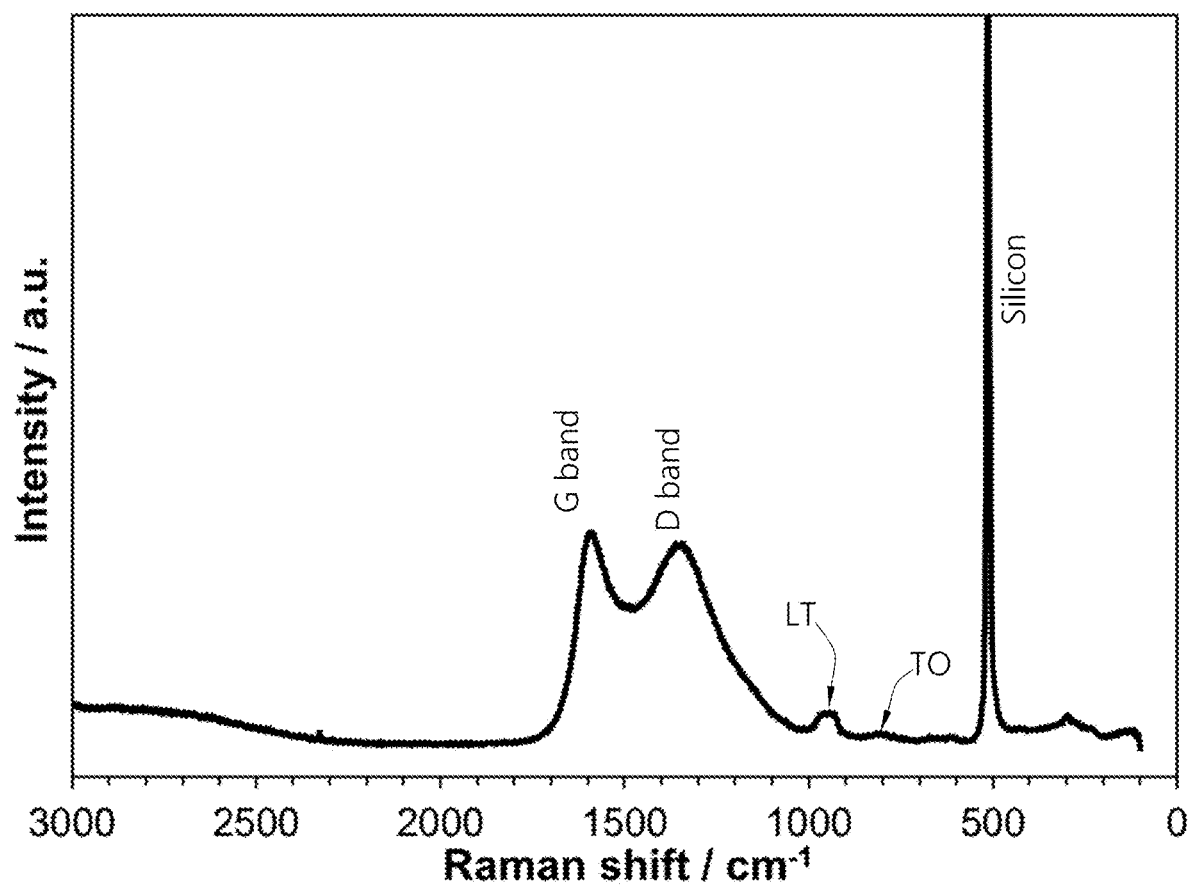
FIG. 5 illustrates the Raman spectrum of a composite anode film pyrolyzed at 850° C.
Figure 6:
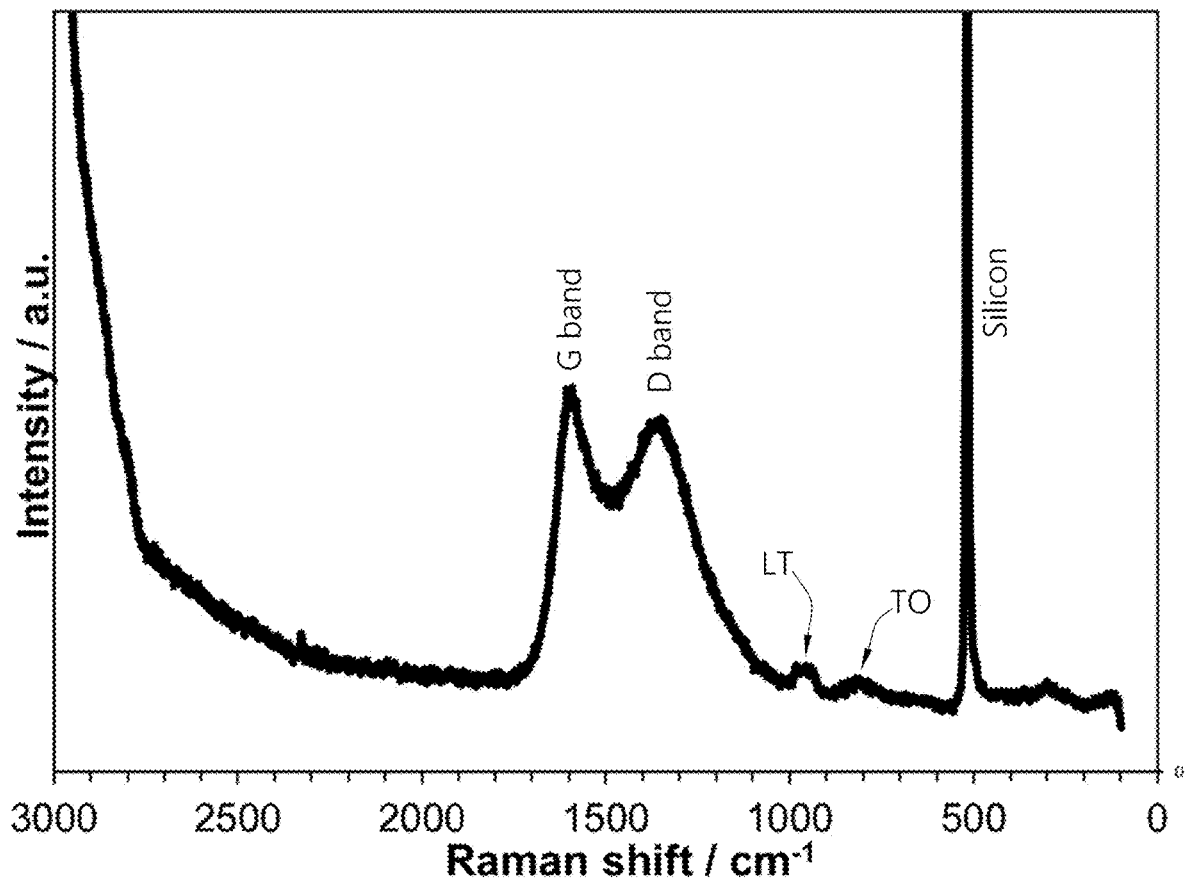
FIG. 6 illustrates the Raman spectrum of a composite anode film pyrolyzed at 900° C.
Figure 7:
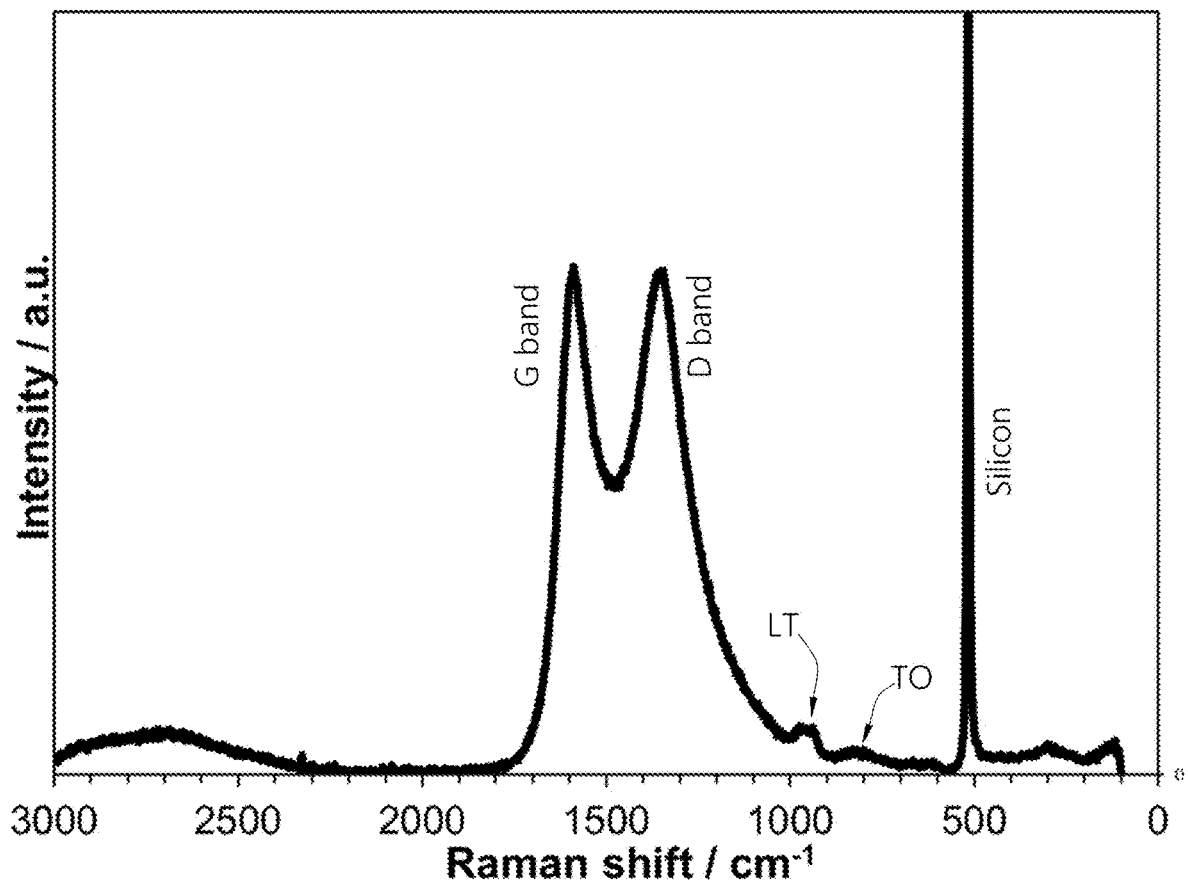
FIG. 7 illustrates the Raman spectrum of two different composite anode films pyrolyzed at 1175° C.

The longitudinal optical (LO) and transverse optical (TO) peaks which indicate the presence of β-SiC in the composite anode samples are observed for composite anode films pyrolyzed at 850° C. and above, as illustrated in FIGS. 5-9. No LO and TO peaks were detected in the Raman spectrum of the unpyrolyzed composite anode film illustrated in FIG. 3, or in the Raman spectrum of the composite anode film pyrolized at 600° C., as illustrated in FIG. 4.

The presence of an intense D band in the Raman spectrum is associated with the defects or disorder in the carbon of the sample composite anode films. As illustrated in FIGS. 4-9, the intensity of the D and G bands increases with an increase in the pyrolysis temperature of the composite anode film samples. This increase in D and G band intensity indicates that the composite anode film samples pyrolyzed at higher temperatures have slightly higher levels of disorder.

Figure 8:
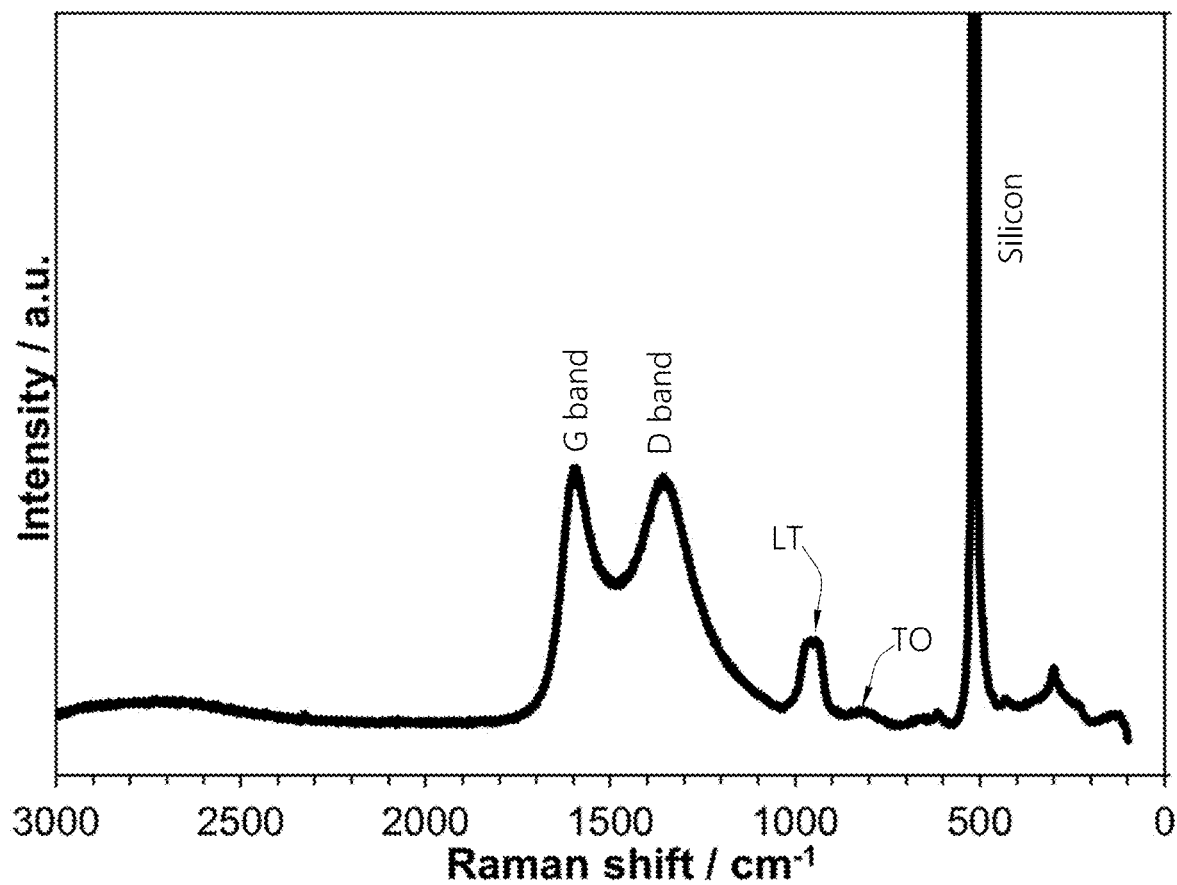
FIG. 8 illustrates the Raman spectrum of a composite anode film pyrolyzed at 1200° C.
Figure 9:
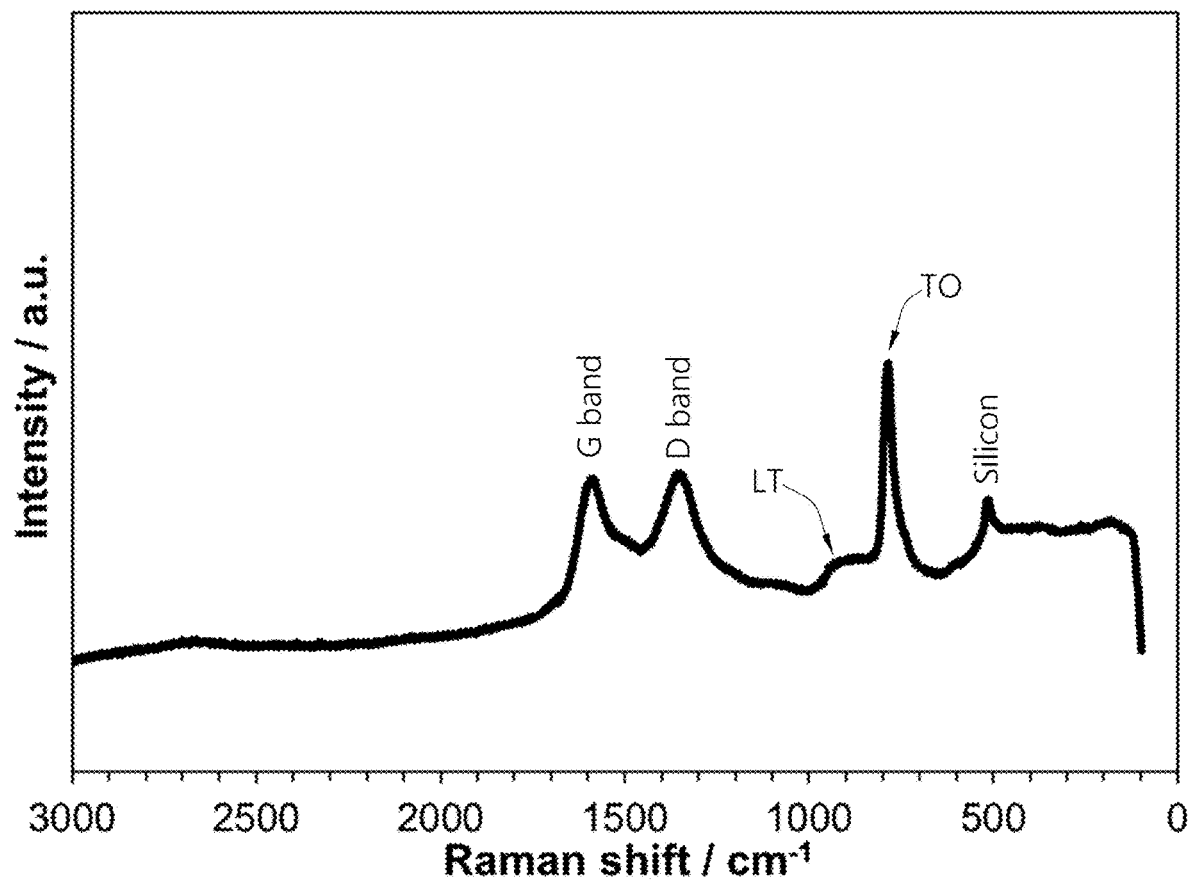
FIG. 9 illustrates the Raman spectrum of a composite anode film pyrolyzed at 1500° C.

A 2D band centered around 2662 cm$^{-1}$ is a single peak associated with sp2 carbon-carbon bonds, which are similar to graphene bonds. As can be seen in FIGS. 8 and 9, the 2D band starts to appear in sample composite anode films pyrolyzed at 1200° C. and above. The presence of this band in the Raman spectra suggests a higher graphitic nature of the carbon present in the sample under high temperature pyrolysis.

Figure 10:
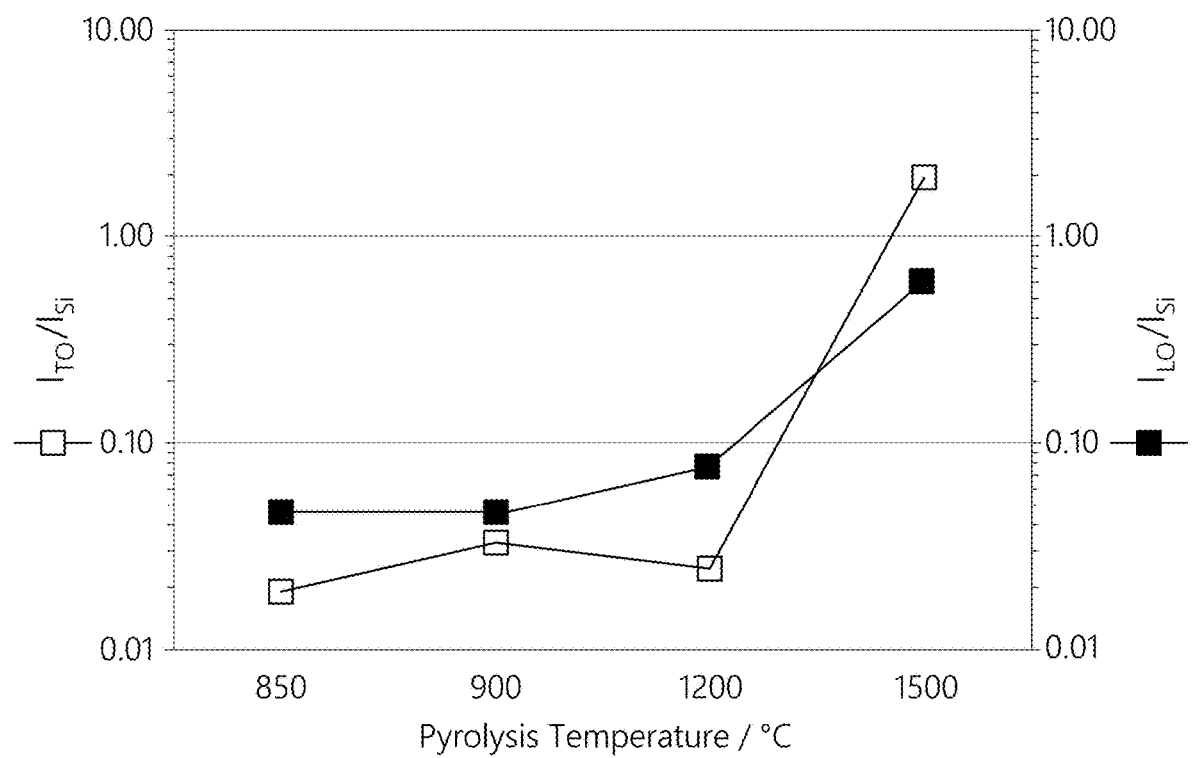
FIG. 10 illustrates the Raman peak intensity ratios for composite anode films pyrolyzed at different temperatures.

FIG. 10 illustrates the intensity ratios of LO and TO peaks compared to the Si peak for composite anode film samples that were pyrolyzed between 850° C. and 1500° C. The ratios of LO and TO peak intensity to Si peak intensity are all above 0.01 for these samples. The plot shows a trend of increasing intensity ratios as the pyrolysis temperature goes up, indicating an increase in the amount of SiC present in the samples.

Figure 11:
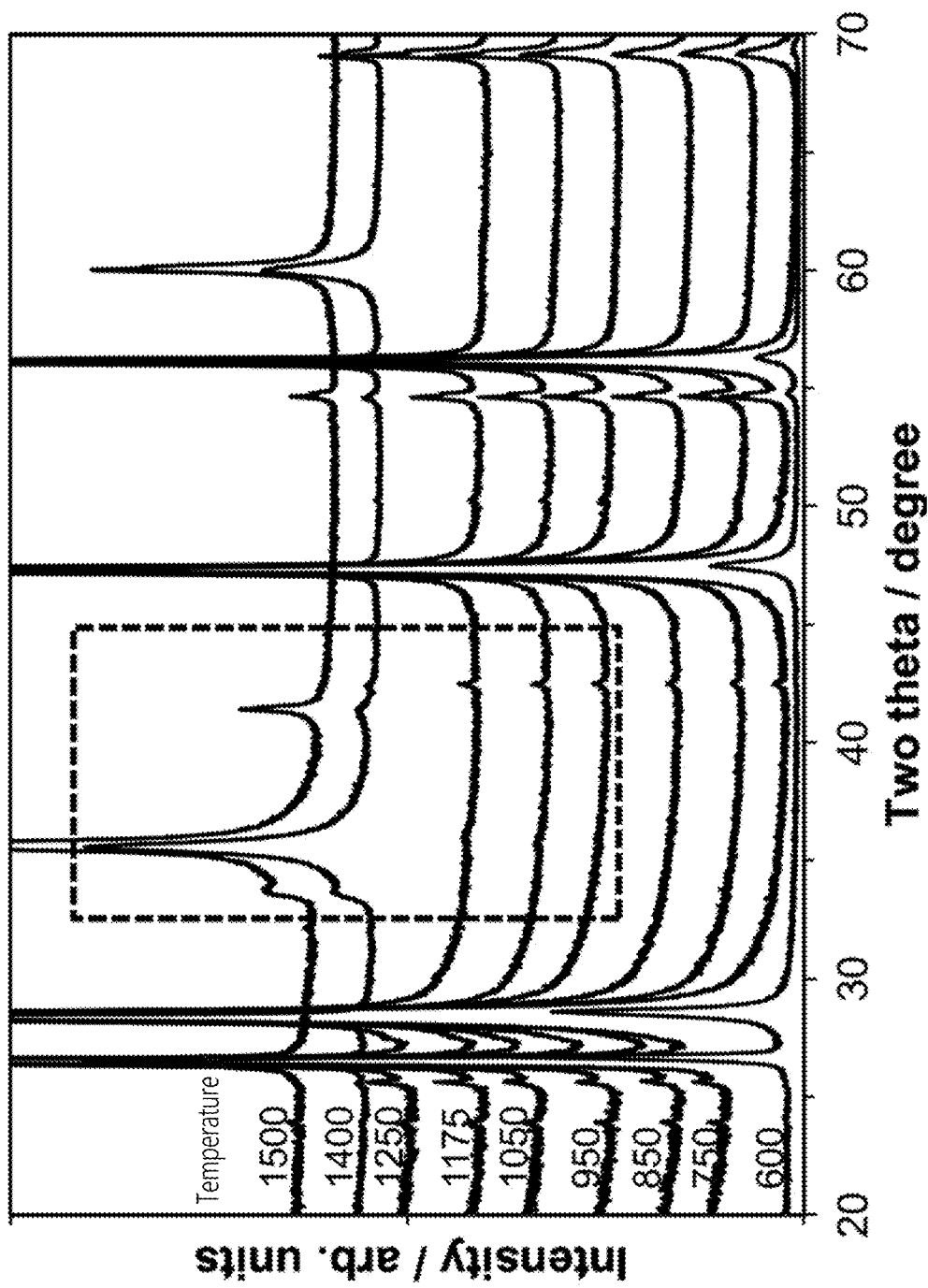
FIG. 11 illustrates the X-ray diffraction (XRD) patterns of sample composite anode films pyrolyzed at different temperatures.

In addition to Raman spectroscopy, X-ray diffraction (XRD) was also used to characterize the composite anode film samples. FIG. 11 illustrates the XRD patterns for a number of sample composite anode films pyrolyzed at temperatures from 600° C. to 1500° C. The XRD patterns of the sample composite anode films pyrolyzed at 1250° C. and below can be indexed as composites of polycrystalline silicon with graphite. This corresponds with the conclusion that samples pyrolyzed at 1250° C. and below are composed of silicon particles and one or more carbon phases, as described herein above. However, XRD patterns for the samples pyrolyzed at 1400° C. and 1500° C. indicate that these samples are primarily composed of SiC and therefore undesirable for use in lithium ion battery cells.

Figure 12:
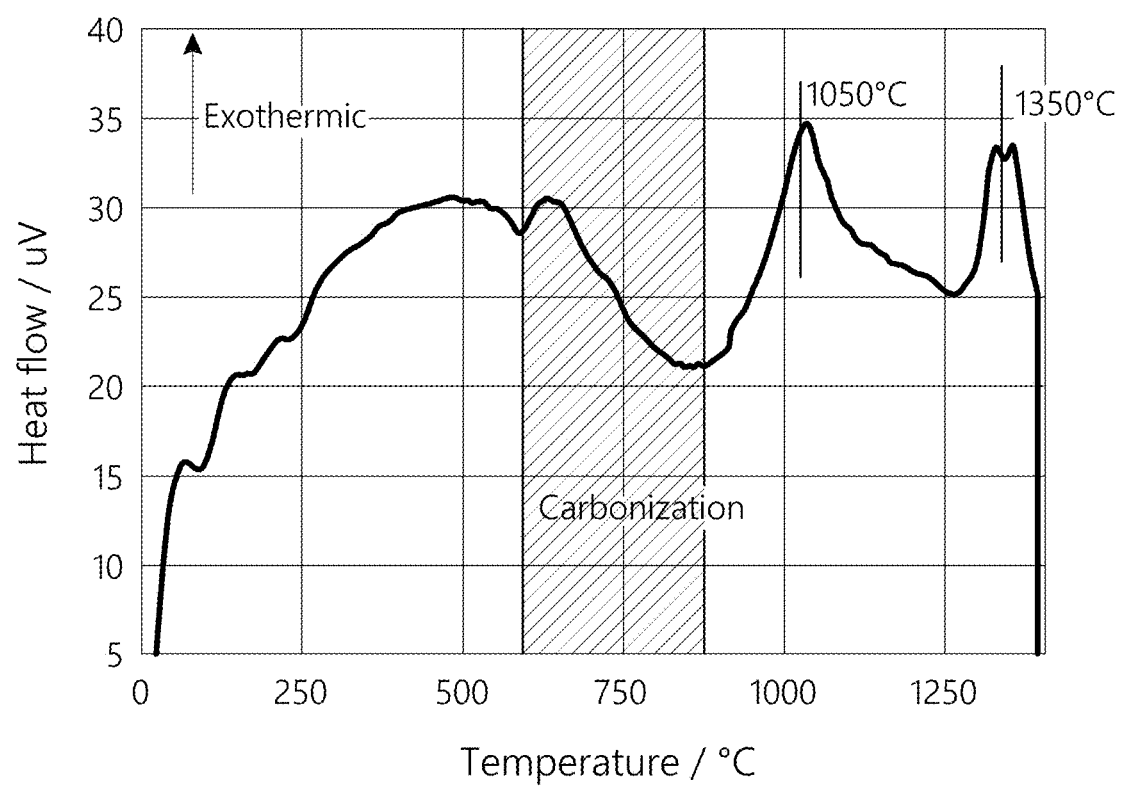
FIG. 12 illustrates a thermogram of a composite anode film sample.

The rectangular box in FIG. 11 highlights the XRD peaks associated with the formation of SiC for composite anode films pyrolyzed under different temperatures. Only traceable amounts of SiC are observed by XRD for composite anode films pyrolyzed between 1050° C. and 1250° C., which verifies that the generation of SiC during pyrolysis occurs due to conversion of native SiO$_2$ to SiC, as is expressed in Equation 2, below. The native SiO$_2$ in these cases is present on the surfaces of silicon particles in the composite anode film samples. Therefore the SiC generated during pyrolysis is likewise located on the surfaces of the silicon particles in the sample composite anodes Differential thermal analysis (DTA) was performed on an unpyrolyzed composite anode film prepared according to methods disclosed herein. The DTA measurement was performed in an ultrahigh purity Argon atmosphere under ambient pressure from 20° C. to 1400° C. The thermogravimetric analysis (TGA) data is illustrated in FIG. 12. The composite anode film sample experienced a primary mass loss starting at 550° C. and ending at 850° C. This mass loss coincides with an endothermic reaction, which confirms that this primary mass loss is due to carbonization of the resin in the sample anodes. Without being bound by any one theory, we believe that there are two exothermic reactions which may occur at higher temperatures. Reaction 1 appears to be centered at 1050° C. and reaction 2 appears to be centered at 1350° C. Again, without wishing to be bound to any one theory, the TGA data together with the Raman and XRD data suggests that these two events are associated with carbothermal reduction reactions between SiO$_2$/Si and C, which leads to the formation of SiC at the Si particle surface.

The proposed carbothermal reduction reactions which occur at temperatures of 1300° C. and below are:

$$SiO_2+C \rightarrow SiO+CO \quad \text{(Equation 2)}$$

$$SiO+2C \rightarrow SiC+CO \quad \text{(Equation 3)}$$

Carbide formation is initially triggered at the interface between the carbon and silicon in the sample once a sufficient temperature (T) is reached for the reaction to occur, which is about 800° C. Without wishing to be bound by any one theory, we believe that under high temperatures, here 1300° C. and above, the carbothermal reaction follows this route:

$$Si(s)+C(s) \rightarrow SiC(s) \quad \text{(Equation 4)}$$

The standard Gibbs free energy (ΔG°) values for all above mentioned carbothermal reactions (Equations 2-4) are negative, which suggests that the reactions of Equations 2-4 are thermodynamically favored reactions.

FIG. 13A shows a dark field scanning transmission electron microscopy (STEM) image taken of a silicon particle of a composite anode film sample prepared according to methods disclosed herein and pyrolyzed at 1175° C. The Si particle is covered with a layer of material of a clearly different phase than the primary Si phase. FIGS. 13B and 13C illustrate the corresponding Energy dispersive spectroscopy (EDS) elemental mapping of C and Si, respectively. The EDS map suggests that this layer is primarily composed of Si and C. The near identical shape and intensity difference of the C and Si elemental maps suggest the silicon particles are coated with a uniform layer of C, with traceable amount of silicon carbide.

Figure 14A:
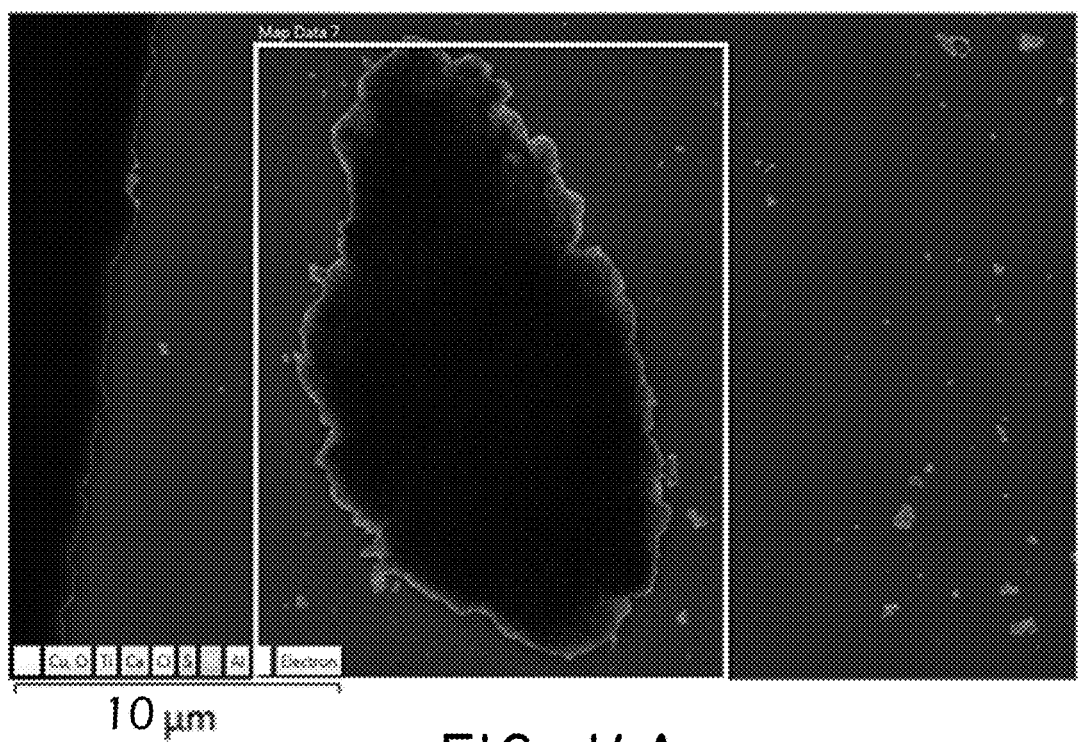
FIG. 14A illustrates a STEM image a composite anode film pyrolyzed at 1500° C.
Figure 14B:
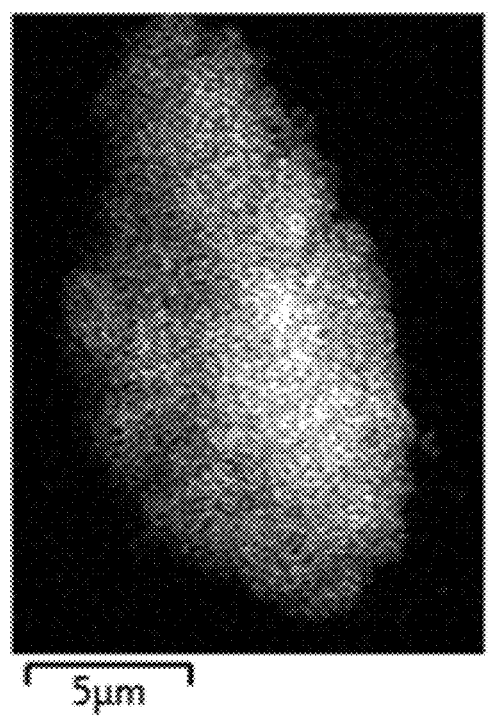
FIGS. 14B-C show corresponding energy dispersive spectroscopy (EDS) elemental maps of C and Si of the composite anode film in FIG. 14A.
Figure 14C:
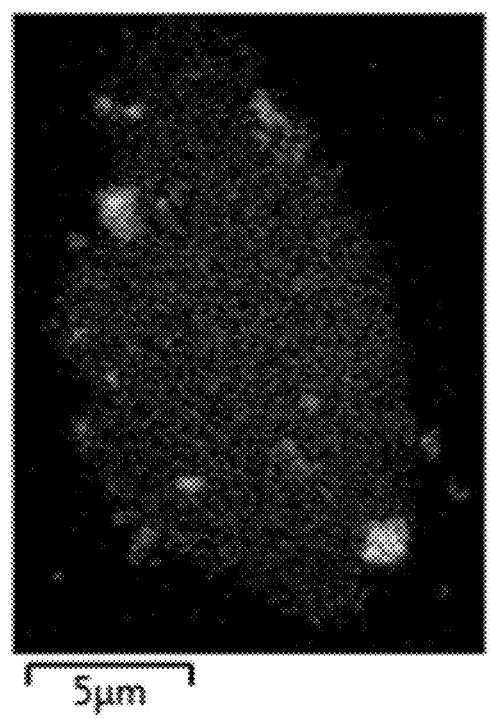

FIG. 14A shows a dark field STEM image of a silicon particle of a composite anode film sample prepared according to methods disclosed herein and pyrolyzed at 1500° C. FIGS. 14B and 14C illustrate the corresponding Energy dispersive spectroscopy (EDS) elemental mapping of C and Si, respectively. Here, as compared with FIGS. 13B and 13C, the EDS maps suggest the formation of SiC.

Figure 15J:
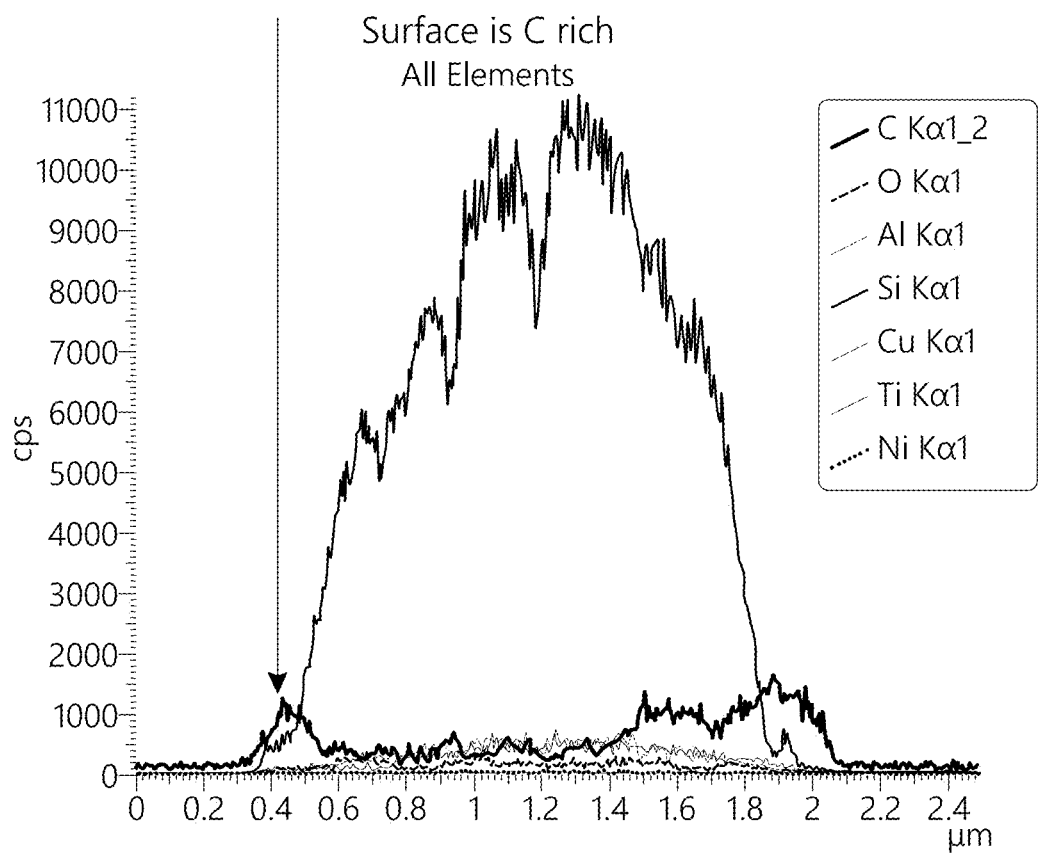
FIG. 15J illustrates a linear scan of the exemplary Si particle shown in FIG. 15I.
Figure 15I:
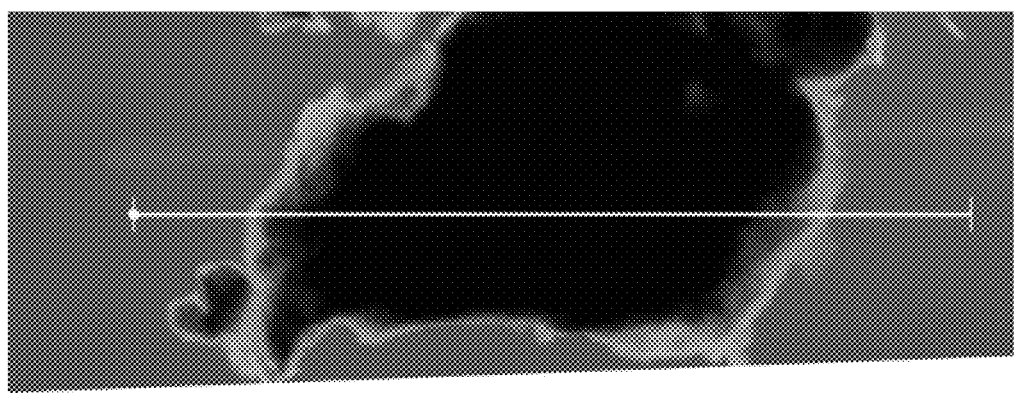
FIG. 15I is a STEM image of an exemplary Si particle.

FIGS. 15A-15H illustrates the EDS images of composite anode film samples prepared according to methods disclosed herein and pyrolyzed at temperatures from 600° C. to 1500° C. The EDS maps for C (FIGS. 15A, 15C, 15E, and 15G) and Si (FIGS. 15B, D, F, and H) demonstrate the evolution of C/SiC layers on Si particles for the composite anode film samples. The C/SiC coatings on silicon particles were observed to be nonuniform and uneven for composite anode films pyrolyzed below 600° C. As depicted in FIGS. 15C and 15D, uniform C/SiC coatings begin to form on the surface of the silicon particles at pyrolysis temperatures of 900° C. and above. FIG. 15J also illustrates a linear scan of an exemplary Carbon coated Si particle as shown in FIG. 15I. The linear scan suggests the surface is carbon rich which is indicative of the formation of a C/SiC coating on the silicon particle.

Referring again to FIGS. 3-10, the Raman spectra show clear evidence of the existence of a SiC/C coating in composite anode films pyrolyzed under temperatures above 900° C. However, SiC/C coatings may be present in films pyrolyzed at temperatures as low as 750° C. and above.

Without wishing to be bound by any one theory, according to observations from the collected XRD patterns and microscopy data, there are two SiC formation mechanisms for pyrolysis of the composite anode films under different temperatures. For higher temperature range, about 1300° C. and above, the formation of SiC is primarily due to solid state reaction between C and Si described above in Equation 4. SiC formed under low pyrolysis temperatures, such as below about 1300° C., is mainly due to the conversion of the native oxide layer ($SiO_2$) of the silicon particles in the samples into SiC (Equations 2-3). It is believed that the first, high temperature, mechanism triggers a side reaction between Si and C (Equation 4) which causes the loss of active material in the composite anode sample, here both Si of the silicon particles and C. The standard Gibbs free energy ($\Delta G°$) carbothermal reaction carries a negative sign which suggests this reaction is thermodynamically favored. Thus, once it is triggered, a large amount of electrochemically unreactive electrically insulating SiC might be formed in the composite anode sample. As a result, the capacity of the composite film will drop and the electrical conductivity will be worsened as the occurrence of the side reaction increases. However, the conversion of unwanted and unavoidable native oxide ($SiO_2$) on the silicon particles into SiC is proved to be beneficial by minimizing irreversible capacity loss in the composite anode film.

Figure 16:
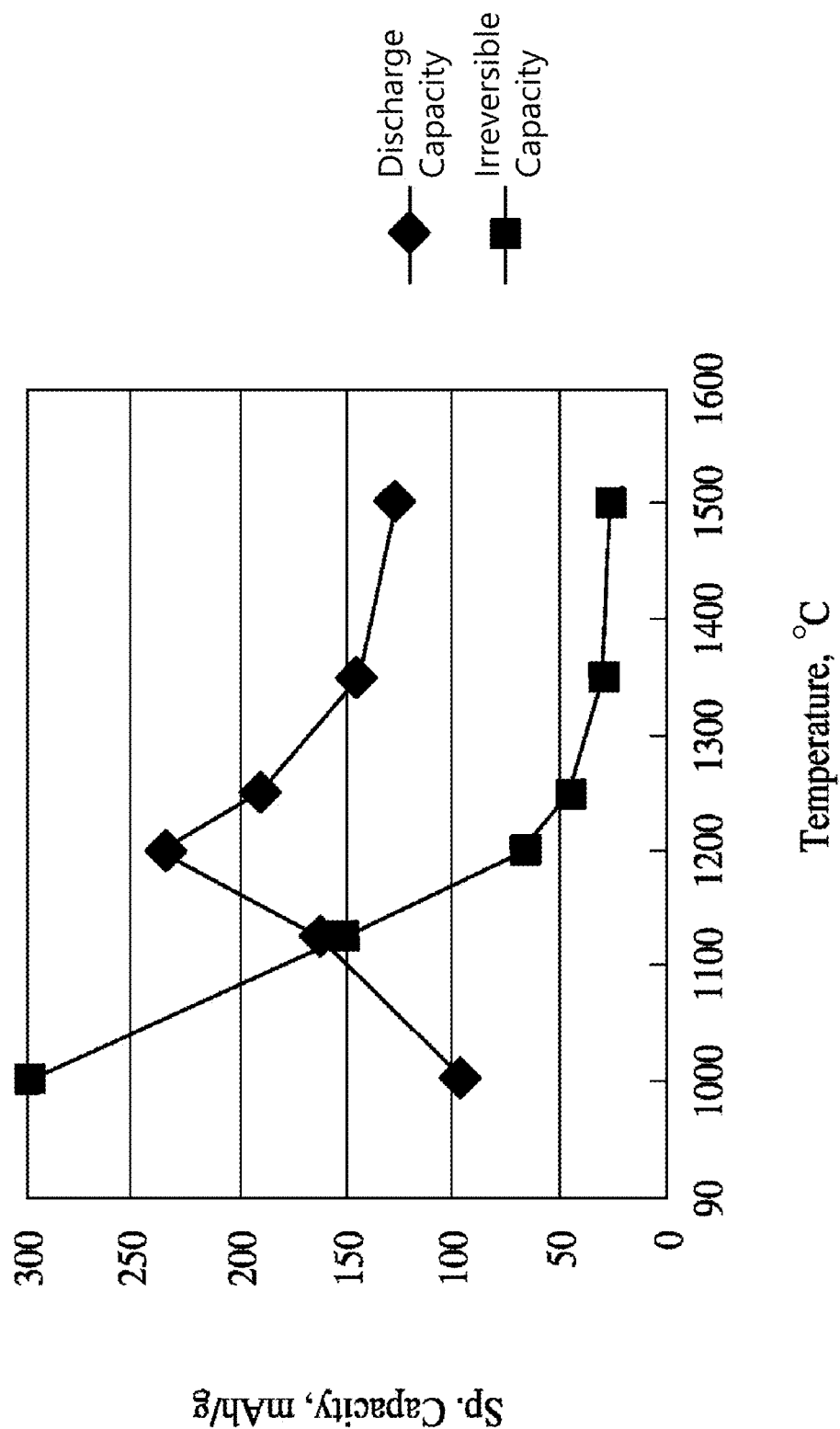
FIG. 16 is a plot of the reversible (discharge) and irreversible capacity as a function of pyrolysis temperature for composite anode film samples.

These trends are demonstrated in FIG. 16, which is a plot of the reversible (discharge) and irreversible capacity as a function of pyrolysis temperature for composite anode film samples. FIG. 16 shows that for pyrolysis temperatures under 1200° C., the discharge capacity of the composite anode film samples increases with the increase of pyrolysis temperature while the irreversible capacity decreases with the increasing of pyrolysis temperature. At pyrolysis temperatures above 1200° C., the irreversible capacity tends to stabilized and discharge capacity drops, as would be expected due to the loss of active material in the composite anode sample from the solid state side reaction between Si and C (Equation 4).

Figure 17:
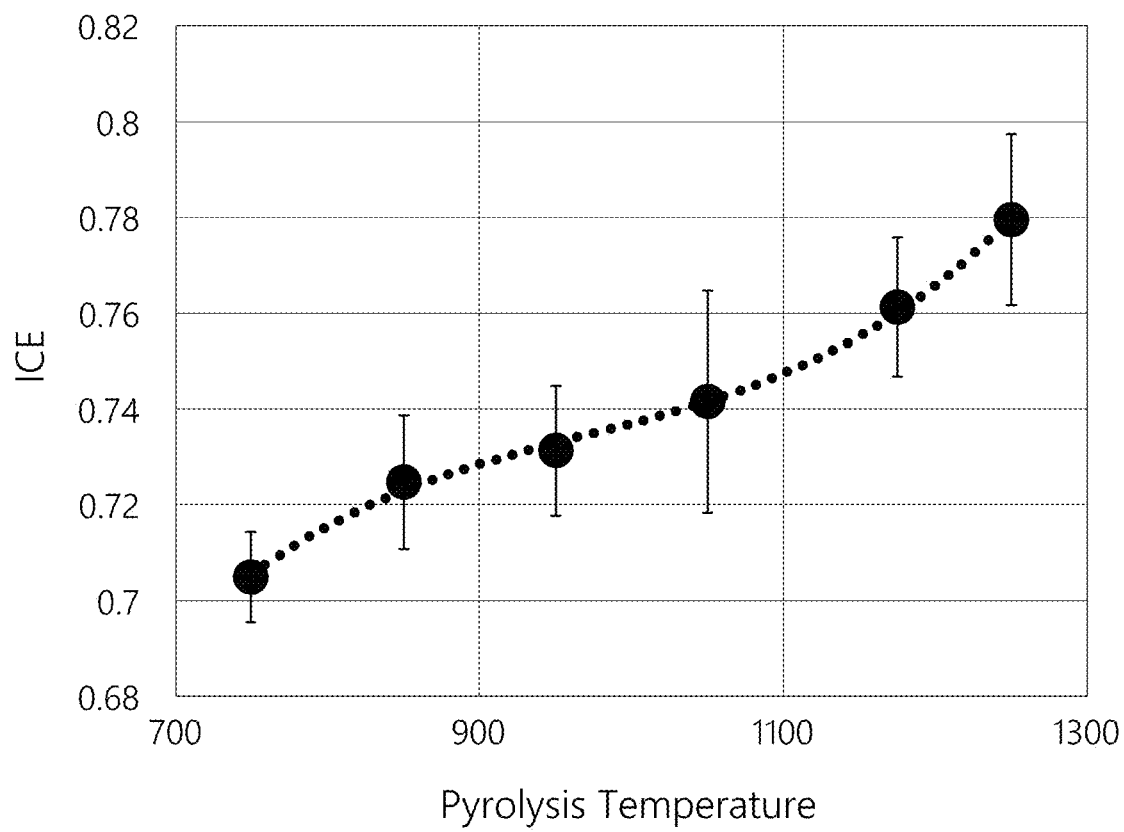
FIG. 17 illustrates the ratio between the first discharge capacity and the first charge capacity of composite anode films pyrolyzed at different temperatures.

FIG. 17 illustrates the ratio between the first discharge capacity down to 3.3V and the first charge capacity of lithium ion battery cells including composite anode film samples prepared according to methods described herein and pyrolyzed at temperatures from about 750° C. to 1250° C. The ratio of first discharge capacity to first charge capacity increases with increasing pyrolysis temperatures. Without wishing to be bound by any one theory, we believe that the surface modification of the silicon particles in the composite anode film samples with a SiC/C coating can help to constrain the outward expansion of the silicon particles during lithiation and enhance the electronic charge transfer within the electrode, thereby improving capacity retention during cycling.

Figure 18:
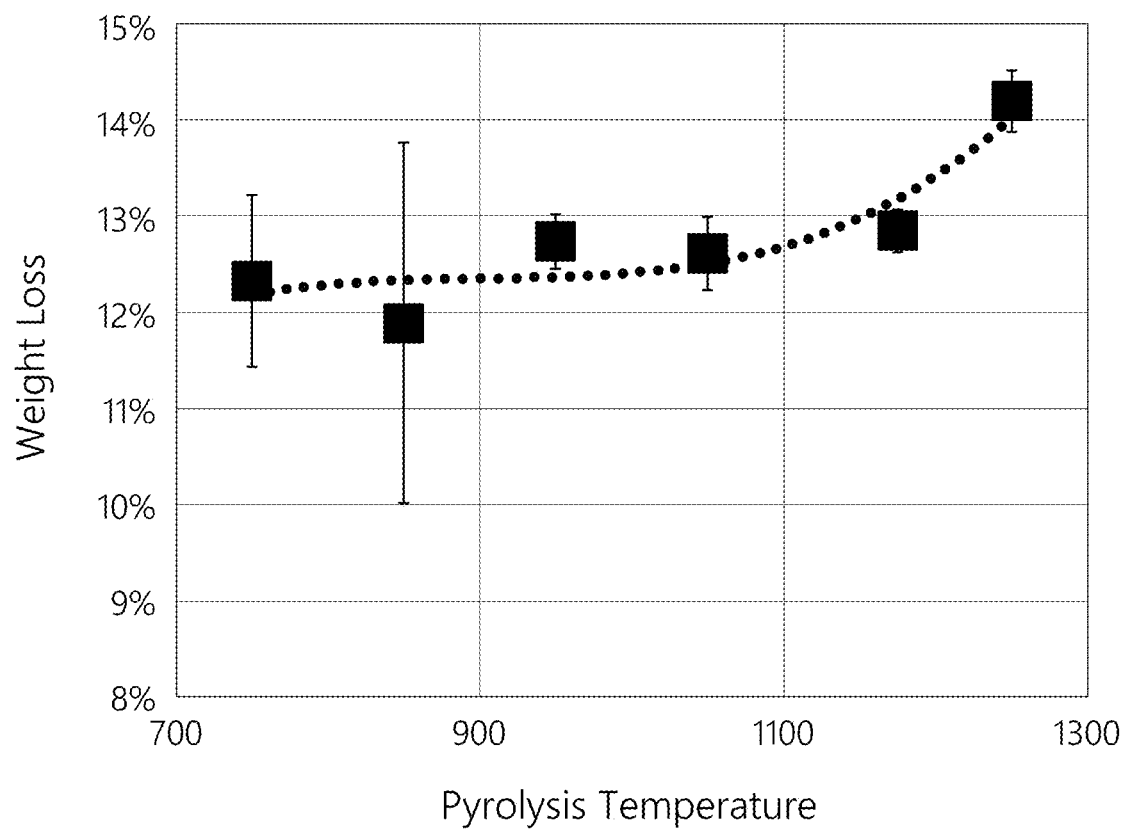
FIG. 18 illustrates percent weight loss after pyrolysis of composite anode films pyrolyzed at different temperatures.

FIG. 18 illustrates the weight loss after pyrolysis of composite anode film samples prepared according to methods disclosed herein and pyrolyzed at temperatures from about 750° C. to about 1250° C. An increase in weight loss is observed in the composite anode film sample pyrolyzed above 1200° C. Without wishing to be bound by any one theory, it is believed that this increase in weight loss is due to the unfavorable side reaction of Si and C to form SiC (Equation 4) and the loss of active material in the composite anode sample. Therefore, it is beneficial to perform pyrolysis at temperatures below about 1200° C. in order to avoid this reaction in the composite anode samples.

Figure 19:
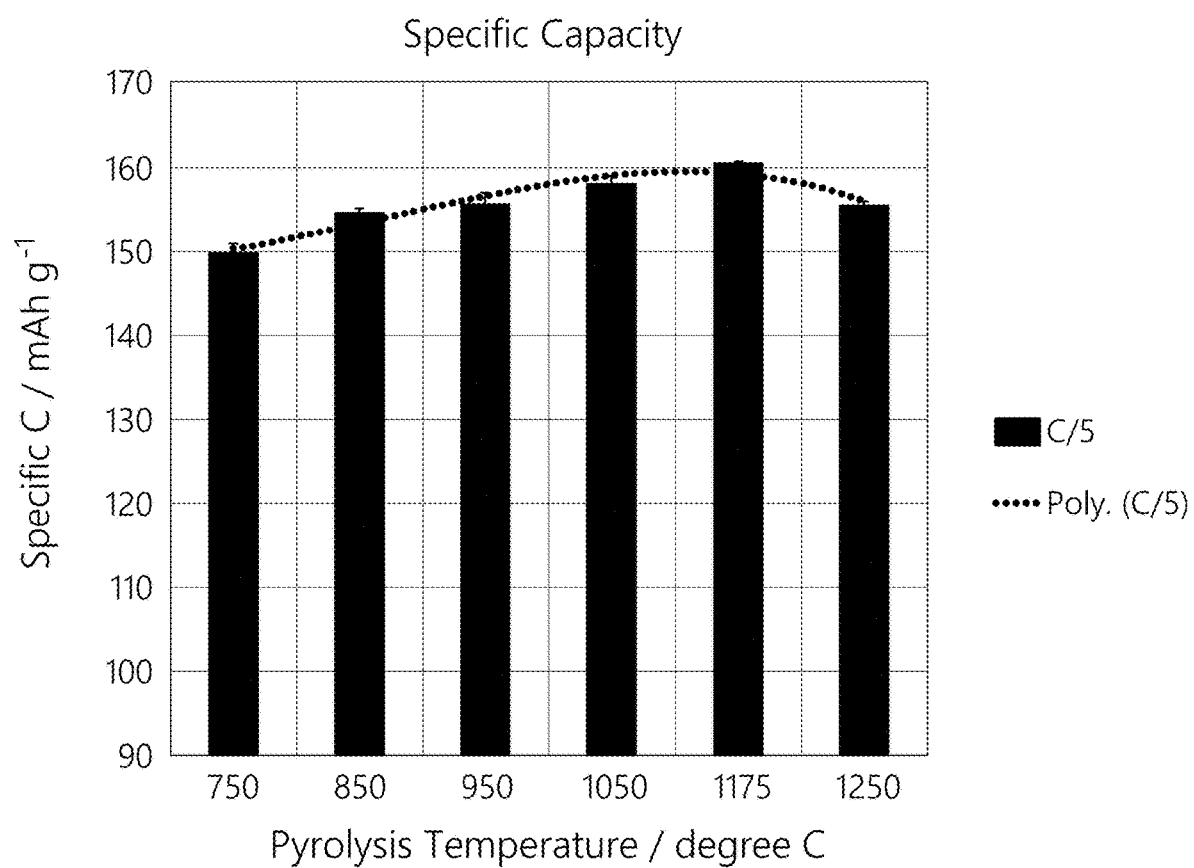
FIG. 19 illustrates the summarized specific capacities of full lithium ion battery cells including composite anode films pyrolyzed at different temperatures.

FIG. 19 illustrates the summarized specific capacities of full lithium ion cells including composite anode films pyrolyzed at temperatures from 750° C. to 1250° C. The specific capacities of the cells begin to decrease after about 1175° C. It is believed that the increase in specific capacity with increasing pyrolysis temperature is at least partially due to the conversion of native $SiO_2$ of the silicon particles into SiC, while at pyrolysis temperatures above about 1200° C., the conversion of active material into SiC leads to a decrease in specific capacity.

Figure 20:
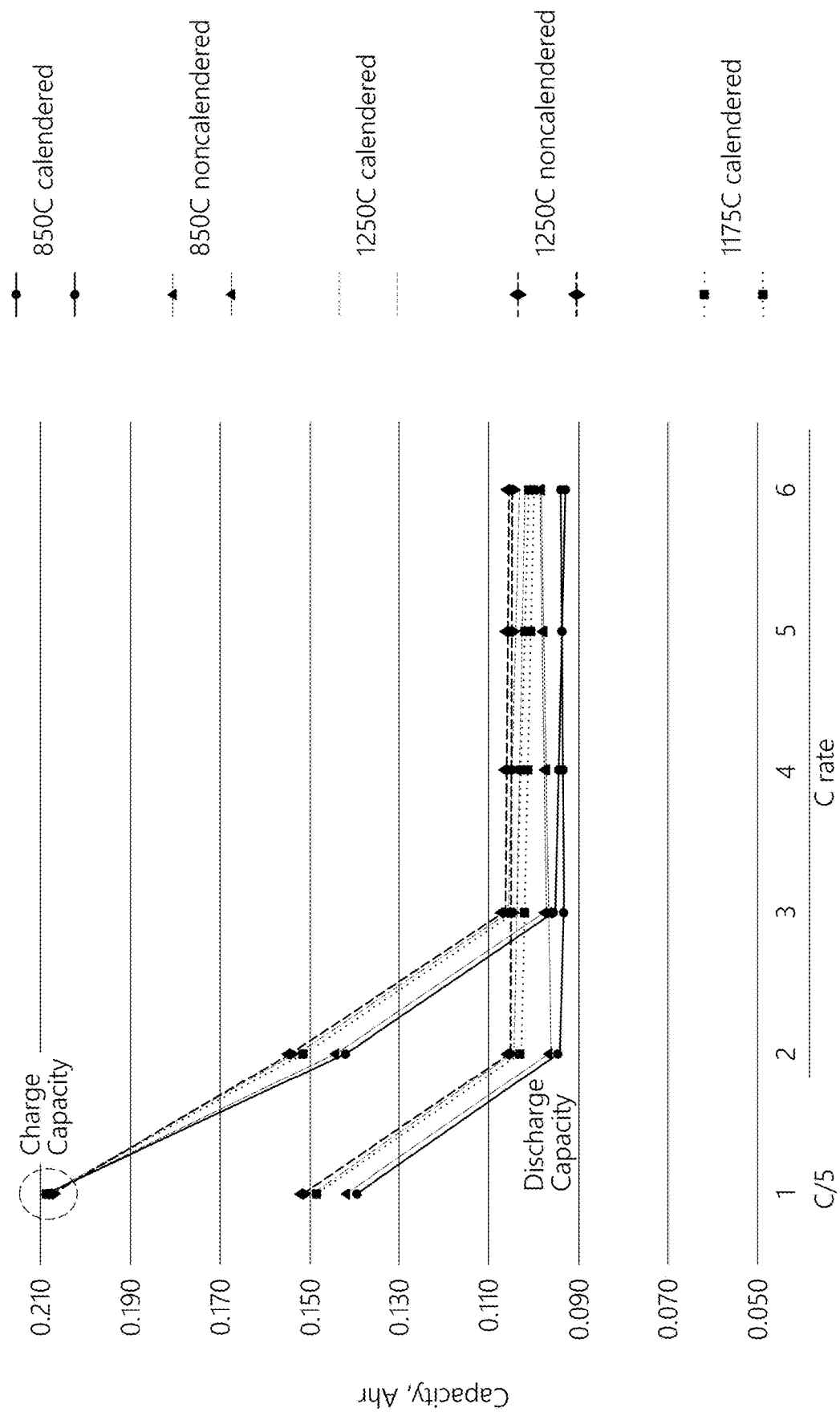
FIG. 20 illustrates charge and discharge capacities for composite anode films pyrolyzed at different temperatures.

FIG. 20 illustrates charge and discharge capacities for composite anode film samples, both calendered (high density) and noncalendered (low density), pyrolyzed at temperatures from 850° C. to 1250° C. All of the samples show identical charge capacity, however the conversion of native $SiO_2$ of the silicon particles in the samples into SiC helps to achieve relatively high discharge capacities which thereby leads to a relatively high capacity in subsequent charge/discharge cycles. FIG. 21 illustrates the discharge voltage profiles of composite anode film samples prepared according to methods described herein and pyrolyzed at temperatures from 850° C. to 1250° C. Again, increasing pyrolysis temperature, which leads to conversion of native $SiO_2$ of the silicon particles in the samples into SiC, results in improved sample performance.

Figure 22:
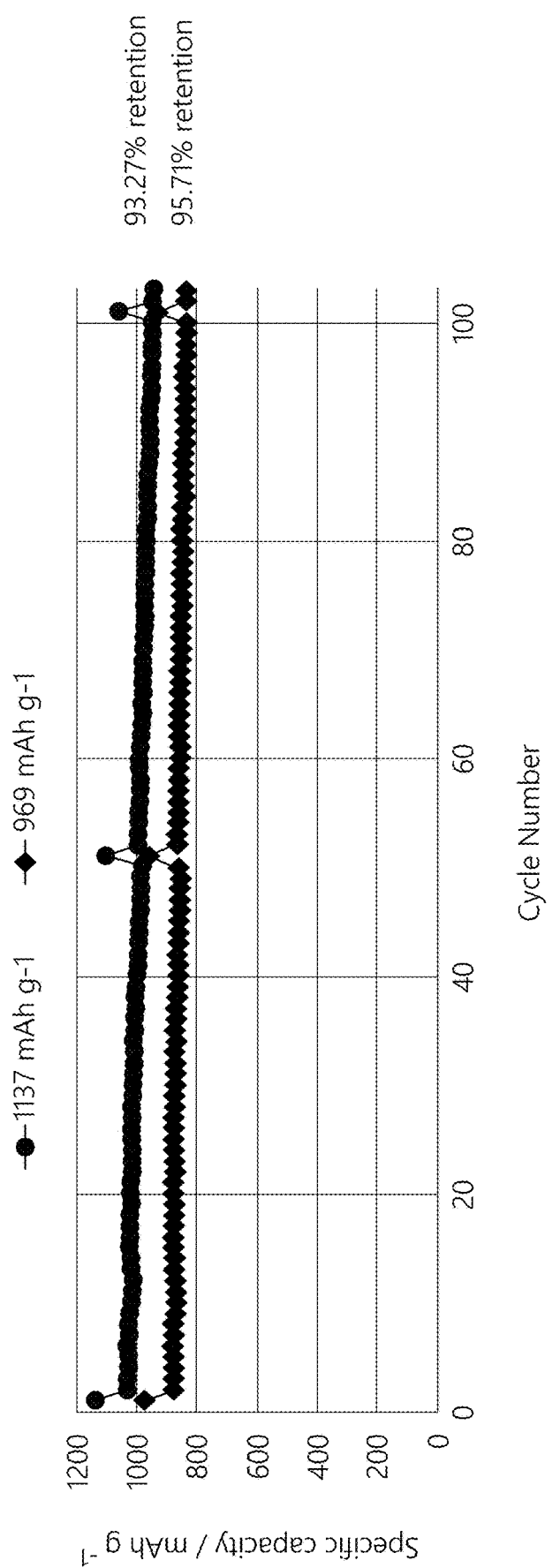
FIG. 22 illustrates cycling performance of full scale battery cells samples with anode specific capacities of 1.137 Ah/g and 0.969 Ah/g.

Lithium ion batteries (2 Ah capacity pouch cell) were fabricated with sample pyrolyzed composite anode films prepared according to methods described herein. Lithium cobalt oxide was used as a cathode material in the battery cells. The cycling performance of the prepared batteries was then tested. FIG. 22 illustrates the cycling performance of two sample battery cells with specific anode capacities of 1.137 Ah/g and 0.969 Ah/g respectively. The cycling performance demonstrates that batteries based on composite anode films as described herein have good cycling stability and reversibility, with anode utilization at or above 1 Ah/g which is about 3 times that of conventional graphite based anodes.

Figure 23A:
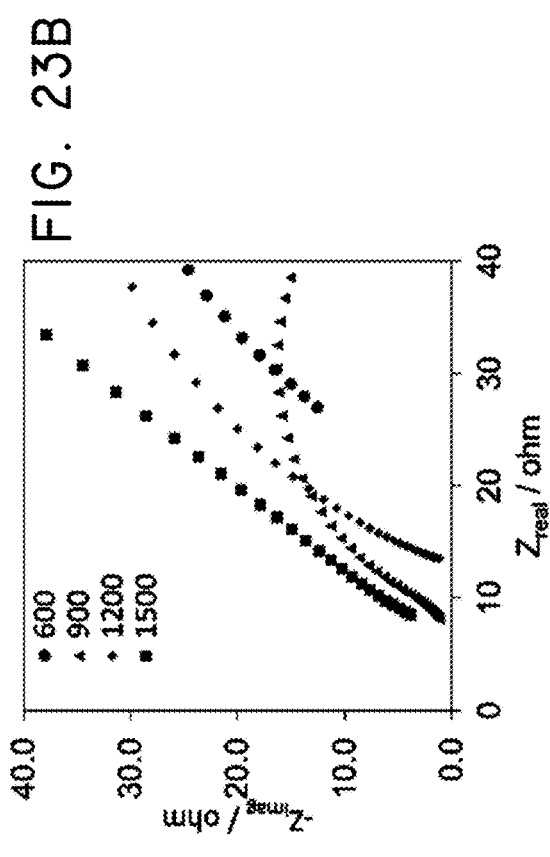
FIGS. 23A-D illustrates the electrochemical impedance spectroscopy data of composite anode films pyrolyzed at different temperatures.
Figure 23B:
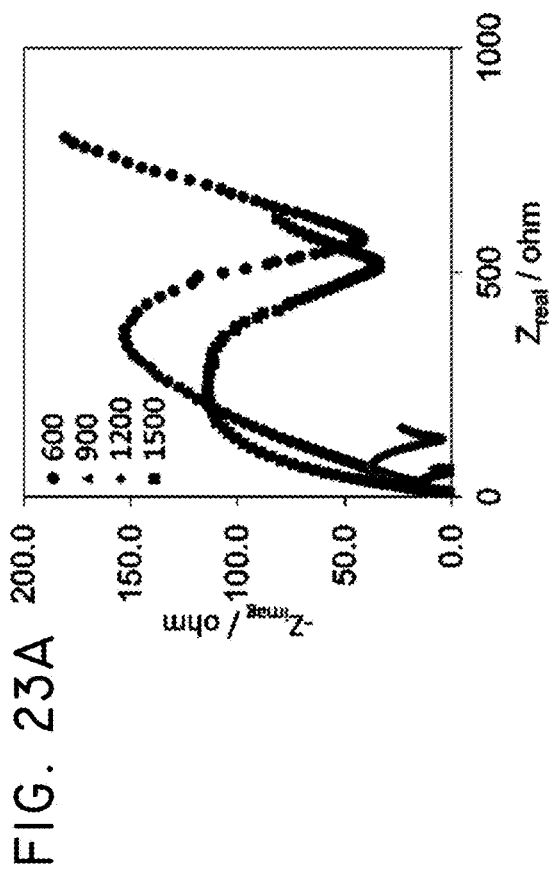

FIGS. 23A-D illustrate the electrochemical impedance spectroscopy data of lithium ion battery cells with composite anode film samples pyrolyzed at different temperatures. In addition to minimizing irreversible capacity loss, it is believed that the SiC/C coatings on the silicon particles of the composite sample anodes help to achieve improved charge and ion transfer within the electrode, thereby affecting the rate of performance of the composite anode film. FIG. 23A shows the electrical impedance spectra for battery cells made with anode samples pyrolyzed at temperatures ranging from 600° C. to 1500° C. It is clear that the cells with anode samples pyrolyzed at 900° C. and 1200° C. demonstrate significantly reduced impedance compared to those cells with anode samples pyrolyzed at 600° C. and 1500° C. It is believed that this reduction in impedance is due to the presence of SiC/C coatings on the silicon particles of the anode samples pyrolyzed at 900° C. and 1200° C. FIG. 23B shows an enlarged portion of the graph of FIG. 23A near the origin. Here, again, it is clear that the SiC/C coatings on the silicon particles of the anode samples pyrolyzed at 900° C. and 1200° C. significantly reduce the impedance of the corresponding cell when compared with cells using anode samples pyrolyzed at 600° C. and 1500° C.

Figure 23C:
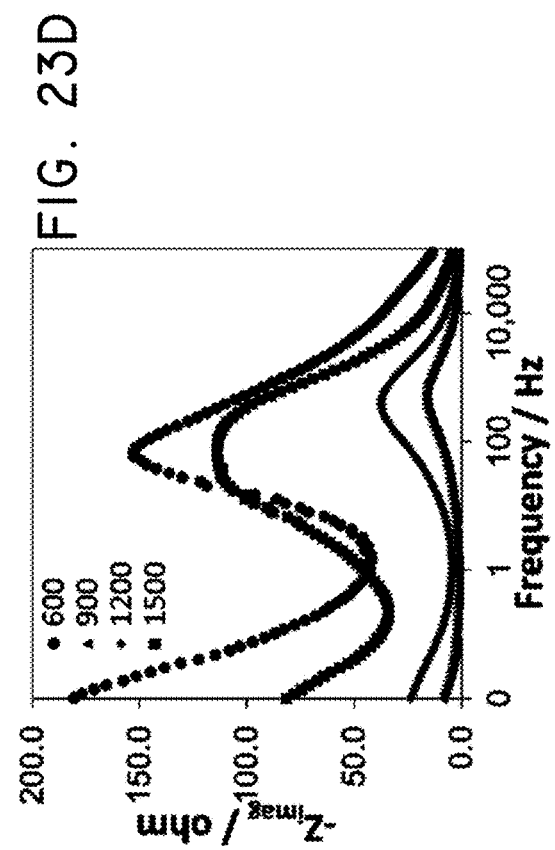
Figure 23D:
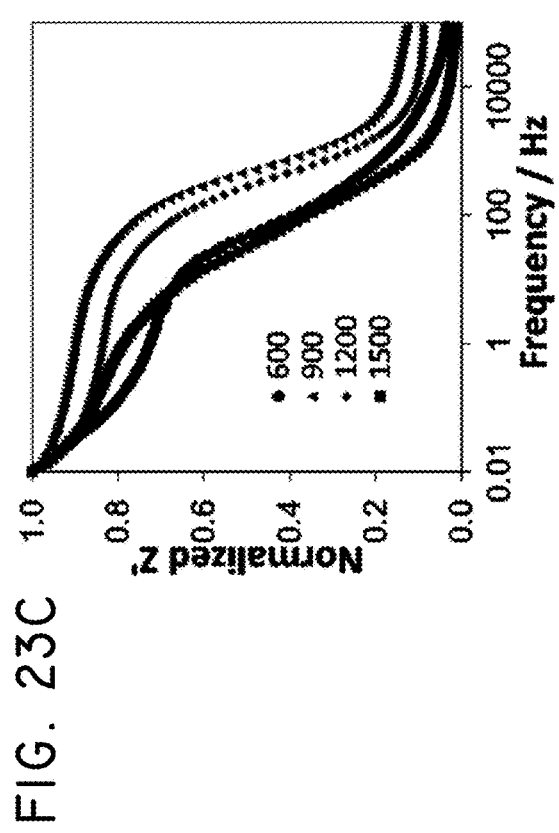

FIG. 23C shows the normalized trends for the absolute impedance values of lithium ion battery cells using anode samples pyrolyzed at temperatures ranging from 600° C. to 1500° C. The graph has been normalized to have an absolute highest value of 1. The difference in shape of the impedance trends for the cells with anode samples pyrolyzed at 900° C. and 1200° C. as compared to the cells with anode samples pyrolyzed at 600° C. and 1500° C. evidences the fact that SiC/C coatings were formed on silicon particles in the anode samples pyrolyzed at 900° C. and 1200° C. and not on the silicon particles in the anode samples pyrolyzed at 600° C. and 1500° C. FIG. 23D illustrates a plot of the imaginary portion of the impedance versus frequency for lithium ion battery cells using anode samples pyrolyzed at temperatures ranging from 600° C. to 1500° C. The plot illustrates that the silicon particles of the anode samples pyrolyzed at 900° C. and 1200° C. have SiC/C coatings which serve to reduce the impedance of corresponding lithium ion battery cells when compared with cells constructed with the anode samples pyrolyzed at 600° C. and 1500° C. Additionally, as seen in FIG. 20, those composite anode films that were pyrolyzed at higher temperatures show improved charge and ion transfer, which corresponds to the presence of SiC/C coatings on the silicon particles of the samples.

Various embodiments have been described above. Although the invention has been described with reference to these specific embodiments, the descriptions are intended to be illustrative and are not intended to be limiting. Various modifications and applications may occur to those skilled in the art without departing from the true spirit and scope of the invention as defined in the appended claims.

What is claimed is:

1. A composite material film comprising:
   greater than 0% and less than about 90% by weight of silicon particles, wherein substantially all of the silicon particles have surface coatings comprising a mixture of carbon and silicon carbide; and
   greater than 0% and less than about 90% by weight of one or more types of carbon phases, wherein at least one of the one or more types of carbon phases is a substantially continuous phase throughout the composite material film and the silicon carbide is between the silicon particles and the one or more types of carbon phases.

2. The composite material of claim 1, wherein an average particle size of the silicon particles is from about 0.1 microns to about 30 microns.

3. The composite material of claim 1, wherein the silicon particles are from about 90% pure silicon to about 100% pure silicon.

4. The composite material of claim 1, wherein the surface coatings further include silicon monoxide (SiO), silicon dioxide ($SiO_2$), or silicon oxide ($SiO_x$).

5. The composite material of claim 1, wherein the surface coatings are a substantially continuous layer.

6. The composite material of claim 1, wherein the composite material is self-supported.

7. The composite material of claim 1, wherein the at least one of the one or more types of carbon phases that is a substantially continuous phase is electrochemically active and electrically conductive.

8. A lithium-ion battery electrode comprising the material of claim 1.

* * * * *